US009465604B1

(12) United States Patent
Burgyan et al.

(10) Patent No.: US 9,465,604 B1
(45) Date of Patent: Oct. 11, 2016

(54) ADDITIONAL CONTENT WITH VARIABLE FIDELITY

(71) Applicant: Amazon Technologies, Inc., Seattle, WA (US)

(72) Inventors: George Elmer Burgyan, Seattle, WA (US); Paul Myoungwhan Choi, Seattle, WA (US); Xu Wei, Seattle, WA (US); Greg Suhyun Kang, Seattle, WA (US); James Andrew Trenton Lipscomb, Seattle, WA (US); Geoffrey Scott Pare, Seattle, WA (US); Robert Daniel Reid, Jr., North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/747,478

(22) Filed: Jun. 23, 2015

(51) Int. Cl.
*G06F 15/16* (2006.01)
*G06F 9/445* (2006.01)
*H04L 29/08* (2006.01)

(52) U.S. Cl.
CPC ............... *G06F 8/65* (2013.01); *H04L 67/32* (2013.01)

(58) Field of Classification Search
CPC ................................. H04L 29/08072
USPC .......................... 709/217, 218, 219
See application file for complete search history.

(56) References Cited

U.S. PATENT DOCUMENTS

| 2012/0150639 | A1* | 6/2012 | Li ...................... G06Q 30/0251 705/14.49 |
| 2014/0316913 | A1* | 10/2014 | He ...................... H04L 67/2804 705/14.73 |

* cited by examiner

*Primary Examiner* — Andy Ho
(74) *Attorney, Agent, or Firm* — Baker & Hostetler LLP

(57) ABSTRACT

Technologies are disclosed herein for displaying application content and additional content, such as advertisements, notifications, and other additional content. A first version of additional content may be received by a client device, for example, when the client device is connected to a network, and stored on the client device. The client device may determine if one or more conditions are satisfied for retrieving, over a network, a second version of the additional content. The second version may have a higher video fidelity than the first version. If the one or more conditions are satisfied, the client device may retrieve the second version and display the second version of the additional content. If the one or more conditions are not satisfied, the first version may be retrieved and displayed. Subsequent to displaying the first or the second version of the additional content, the application content may be displayed.

20 Claims, 11 Drawing Sheets

ADDITIONAL CONTENT WITH VARIABLE FIDELITY

BACKGROUND

The development and use of applications, such as mobile applications, including a variety of functionality, is becoming increasingly widespread. Applications may require a wide range of resources, such as network communications bandwidth, processing and memory, other others to execute property and to provide an enjoyable user experience. In some examples, applications may be offered for purchase via various application stores, which are commonly referred to as "app stores". Additional content, such as advertisements and notifications, may also be presented on a client device to a user, for example, in conjunction with one or more applications. In some examples, additional content may be provided to a client device, upon request, from an external source (e.g., a server) using a bandwidth-constrained network. In such cases, when a client device cannot be connected to a network, the client device may not be capable of obtaining and presenting additional content. This may reduce the opportunity to present additional content and may result in lost revenue for providers of the additional content. Also, in some examples, even when a network connection is available, there may not be sufficient available network bandwidth to download the additional content within a desired time period. For example, this lack of available network bandwidth may occur in scenarios when there is poor network quality, when the client device is engaged in other substantial network communications, and/or other scenarios. The disclosure made herein is presented with respect to these and other considerations.

DETAILED DESCRIPTION

Figure 1:
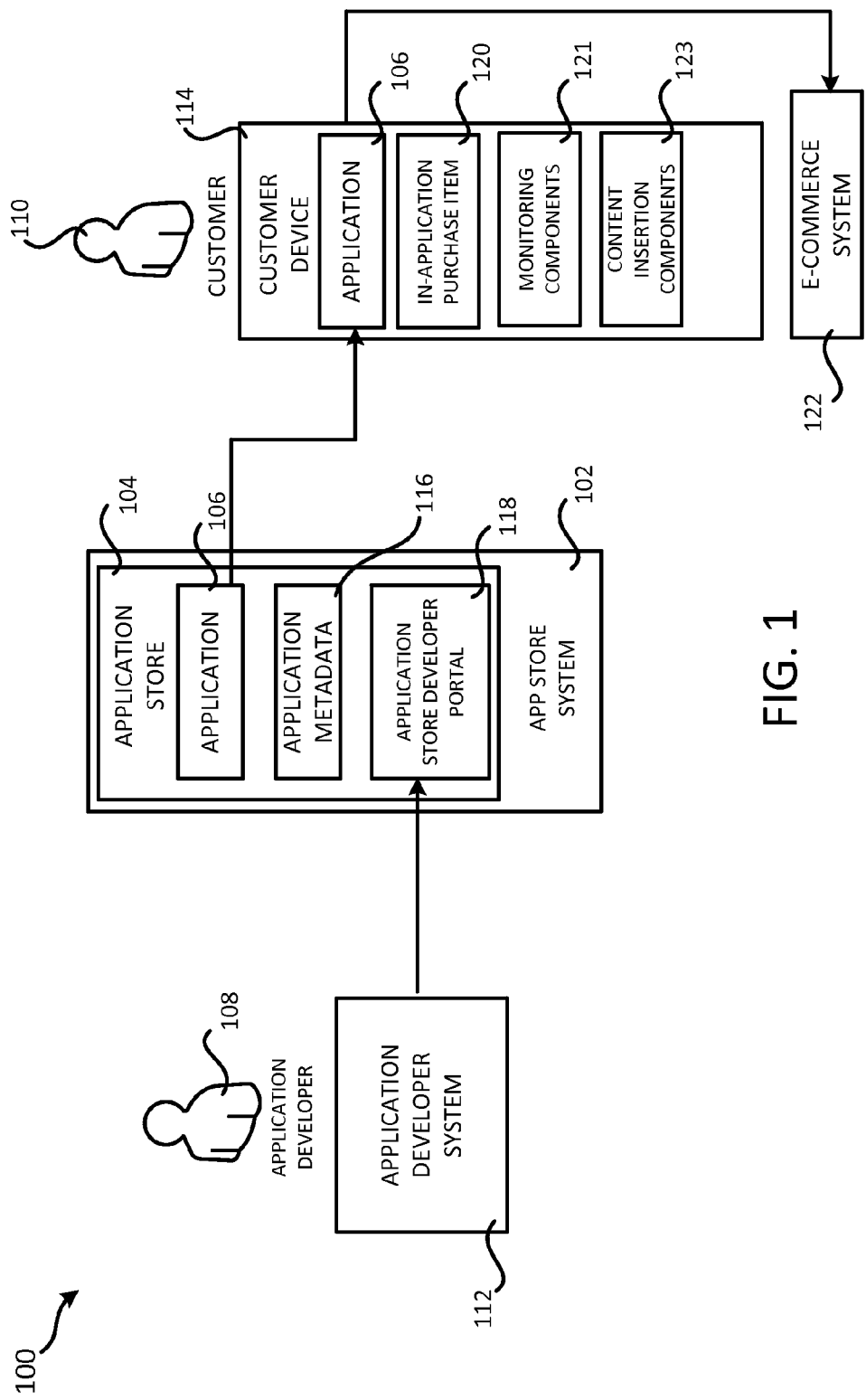
FIG. 1 is a system architecture diagram showing aspects of the configuration and operation of several components described herein for providing applications and in-application purchase ("IAP") items.

The following detailed description is directed to technologies for presenting and displaying additional content in conjunction with content associated with an application, for example, on a client device. In some examples, a client device may not have the resources or a sufficient network connection to receive and present additional content, such as advertisements and notifications. In one example, the client device may lose network connectivity from time to time, for example preventing the device from receiving additional content for presentation. To address these and other concerns, a first version of content, e.g., having lower resolution, less features, no interactive features, lower fidelity, etc., may be sent to the client device, during a time when the client device has sufficient network connectivity. The client device may locally store the first version of additional content. In some examples, when the additional content is to be presented, for example as pre-stitial content (such as during the initialization or launching of an application but before the application provides content for display), the client device may make a determination about whether to present the first version of the additional content. In some examples, the client device may select the first version of the additional content to present if, for example, the client device has a poor connection, or is not connected at all, to a network, or is substantially resource limited in other ways (e.g., substantial processing or memory resources are being used, for example, by another application). If, at the time of presentation, the client device has good connectivity and/or is not substantially resource limited, the client device may retrieve or configure and present a higher fidelity or second version of the content. In this way, additional content, such as advertisements, may be presented on a client device even when the device is not connected to a network or is otherwise substantially resource limited, such as by selecting and presenting the first version of the additional content. Moreover, in the case that the device is not substantially resource limited and has a sufficient network connection, a higher fidelity version of the additional content may be presented, for example, to improve the user experience.

In some examples, a device may not have the resources or bandwidth to receive and present additional content when, for example, an application is launching or running on the device. In this scenario, the device may receive a first version of the additional content, e.g., a lower fidelity version, at some time prior to launching an application (e.g., periodically, randomly as new content become available, or at any other various times or intervals). Upon launching the application, the device may also present additional content, such as in the form of a pre-stitial. The client device may determine if one or more associated conditions are satisfied, and if so, the device may retrieve a second version of the additional content and display the second version of the additional content. The device may subsequently display content associated with the application. In some examples, the device may begin launching the application while displaying the additional content. Upon the end of the additional content presentation, the device may then display the content associated with the application.

The one or more conditions for retrieving the second version of additional content may include, for example, at least one of an available network available network connection or meeting specified criteria related to one or more of network connection quality, amount of available bandwidth, amount of available processing resources, amount of available memory resources, device settings, or device characteristics. In some examples, the second version may have a higher fidelity (e.g., visual, graphical, video, and/or audio fidelity) than the first version of additional content, such that it may be transmitted using at least one of a higher encoding bitrate than the first version or a higher proportion of forward error correction that the first version. In some cases, the second version of additional content may include added content that was not included in the first version of the content, such as additional or more detailed graphics, interactive elements, video or higher resolution video, higher resolution images, audio, etc.

In some examples, the client device may receive a request to launch an application associated with application content, and the launching of the application may use a significant amount of resources of the device, such that the device may not have enough resources to display the additional content and begin launching the application in the background. In these instances, the device may sometimes delay launching the application until the presentation of the additional content is finished. In some other examples, the device may determine that it has enough resources to launch the application while displaying the first version of the additional content and not the second version. In this scenario, the device and/or application may be configured to associate a priority with either the additional content or the application. If the application is set with a higher priority, then the first version of the additional content may be presented. If the additional content, however, is set with the higher priority, the application launch may be delayed so that the second version of the additional content may be presented.

In some examples, metrics may be collected, for example, by the client device, that are associated with the additional content. The metric information may include viewership information, user information, and other types of information. The device may transmit the metric information, for example, to a network device or server, for tracking and other analytic purposes, when a satisfactory communications bandwidth is detected over the connection with the network device. In this way, the device may gather and store metric information until a network connection supports uploading the data for further processing.

In some implementations, the additional content may be given a higher priority than one or more applications, for example, to ensure that the additional content is presented in its entirety on the client device. This may be particularly relevant when the additional content includes advertisements, which were purchased based on likelihood of exposure or actual exposure/display on client devices. In these and other scenarios, a content priority mitigation component, instructions, computer code, software development kit (SDK), etc., may configure and enforce content priorities. The content priority mitigation component may ensure or enforce the presentation of the additional content before enabling presentation of content associated with an application. In some cases, the content priority mitigation component or associated instructions may be included with each application, for example, when it is downloaded from an application store by the client device. In other examples, the content priority mitigation component or associated instructions may be provided by the application store directly or by another network component or device.

Additional details regarding the various components and processes described briefly above for managing the presentations of versions of content and applications will be presented below with regard to FIGS. 1-11.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components in system 100 is described herein. As shown in FIG. 1, various computing systems and software components (referred to herein as an application store system 102) may be configured and operated to provide an application store 104. An application store 104 is an electronic marketplace where customers can browse and purchase application programs, such as an application 106, for download and use on their own customer or customer devices, such as the customer or client device 114. An application store 104 might offer applications for use on customer devices 114 such as smart phones, tablet computers, laptop or desktop computers, and/or other types of computing devices.

In order to provide the application store 104 and, potentially, the other functionality disclosed herein, the application store system 102 might include one or more application servers. The application servers may execute a number of software components in order to provide the application store services described herein. The software components may execute on a single application server or in parallel across multiple application servers. In addition, each software component may consist of a number of subcomponents executing on different application servers or other virtual or physical computing resources. Various components may be implemented as software, hardware, or any combination of the two.

It should be appreciated that the application store system 102 shown in FIG. 1 has been simplified for discussion purposes and that many additional software and hardware components may be utilized. In particular, the application store system 102 might interoperate with many other computing systems in order to provide the application store 104. For example, the application store system 102 might interoperate with other systems and/or services not shown in FIG. 1, such as billing systems, reporting systems, customer relationship management systems, and others.

A customer 110 of the application store 104 may use a customer device 114 to access the application store 104 through a network (not shown in FIG. 1), such as the Internet. A customer 110 may be an individual or entity that desires to browse, purchase, or has purchased, one or more applications from the application store 104. The customer device 114 may be a smartphone, personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to a data communications network and communicating with the application store 104.

In some configurations, software components executing on the application store system 102 provide functionality for permitting customers to browse and purchase applications 106 available from the application store 104. For instance, the application store 104 may receive a browse request from a customer device 114 and, in response thereto, retrieve information regarding a particular application 106 offered for sale from the application store 104 referenced by the browse request, generate or retrieve information describing the application, and transmit the information over a network to a client application (not shown in FIG. 1) executing on the customer device 114 for display to the customer 110. The application information may include a name of the application 106, the name of the application developer 108 that developed the application 106, a text description of the application 106, one or more images of the application 106 during execution, a price for the application 106, and/or other information. The application information might be stored in a suitable database or other type of data store maintained by the application store system 102 for each application 106 offered for sale.

The network utilized to connect to the application store 104 might be a local-area network ("LAN"), a wide-area network ("WAN"), the Internet, or any other networking topology known in the art that connects a customer device 114 to the application store 104. A customer 110 may use a client application (not shown in FIG. 1) executing on the customer device 114 to access and utilize the functionality provided by the application store 104. The client application might be a Web browser or a stand-alone client application configured for communicating with the application store 104. The client application might also utilize any number of communication methods known in the art to communicate with the application store 104 across a network, including remote procedure calls, network service calls, remote file access, proprietary client-server architectures, and the like.

The application store 104 might also provide functionality for allowing an application developer 108, via an application developer system 112, to submit an application 106 for inclusion in the application store 104. For example, and without limitation, the application store 104 may be configured to provide an application store developer portal 118 in some configurations. The application store developer portal 118 provides a Web-based interface through which an application developer 108 can create a new developer account in the application store 104, submit an application 106 for inclusion in the application store 104, and define application metadata 116 for the application 106, such as a description of the application 106, the price for the application, if any, and other information pertinent to the application 106.

The application metadata 116 can also include data defining in-application purchase (IAP) items 120, such as available IAP items 120 for an application 106, purchase term, price, etc. An IAP item 120 is an item that a customer 110 can purchase from within an application 106. In-application purchase items 120 can include, but are not limited to, subscriptions, consumables, and entitlements. An in-application subscription may be made of any type of content that carries an entitlement, is bound by a period of time, and may auto-renew at the end of the period. A consumable in-application purchase is content that is used within an application, such as perishable items like extra lives in a game or in-application currency. An entitlement is content that requires access rights to access, such as a purchased copy of an electronic magazine issue or the unlocking of a level in a game. It should be appreciated that these examples are merely illustrative and that an application developer might define metadata 116 for other types of IAP items 120 in other configurations.

Once an application developer 108 has submitted an application 106 and associated application metadata 116 to the application store 104, the operator of the application store 104 may perform a process for approving the application 106 for inclusion in the application store 104. For example, various types of automated tests might be performed on the application. If the operator of the application store 104 approves the application 106 for inclusion in the application store 104, the application 106 will then be made available to customers 110. If the operator of the application store 104 does not approve the application 106 for inclusion in the application store 104, a notification may be transmitted to the application developer 108 indicating that the application 106 was denied and providing a reason for the denial.

The application store 104 may be configured to provide applications 106 and/or IAP items 120 for free or at a reduced cost, while at the same time reasonably compensating the application developer 108 for the usage of the applications 106 and/or IAP items 120. In order to enable this functionality, the application developer 108 may utilize the application store developer portal 118, or another mechanism such as an API, to register an application 106 for participation in a feature provided by the application store by which applications 106 and IAP items 120 that would otherwise not be available for free (i.e., available on one or more application stores other than the application store 104 for a developer-specified price greater than zero) are made available to application store customers 110 for free. During registration of the application 106 as a free application, the application store 104 might also present information to the developer 108 specifying the rate at which the developer 108 will be compensated for usage of the application 106 by customers 110. The developer 108 may indicate their consent to be paid the specific rate.

In some configurations, customers 110 of the application store 104 may also register in order to obtain access to free applications 106 and IAP items 120. For instance, in some configurations, customer participation is enabled through participation in another program provided by the operator of the application store 104, such as participation in a program by which the customer 110 receives free shipping for purchase made through an e-commerce system associated with the application store 104 and, potentially other benefits, by paying a fee.

In some configurations, the customer 110 is required to download, install and utilize a specific application on their customer device to participate in the program and access the free applications and IAP items. For example, and without limitation, a customer may be required to install and utilize an application that provides access to free applications 106 and IAP items 120 that also provides access to an e-commerce system 122 operated by the operator of the application store 104. The application might also provide inserted content, such as recommendations of e-commerce items of interest to the customer 110, advertisements to the customer 110, and/or other offers to make a purchase of items. This inserted content may be inserted into the application and/or application display area by, for example, content insertion components 123. In some configurations, the application presents a full screen advertisement at the time the application is launched (e.g., pre-stitial content). The advertisement might be an advertisement for an item available from the e-commerce system 122, for example. In this way, the operator of the application store 104 and the e-commerce system 122 may be able to recoup all or a portion of the payments made to developers 108 for usage of free applications and IAP items 120 from purchase made through the e-commerce system 122. Similar advertisements or additional content may be presented through other applications and at other times on the customer device 114 in a similar manner.

When an eligible customer 110 utilizes the designated application to browse the application store 104, applications 106 available through the service described above will be shown as being free. Similarly, IAP items 120 for applications 106 that have been designated by their developers as being a part of the service will also be shown as being free. An eligible customer 110 can then download and utilize the eligible applications 106 and IAP items 120 without incurring any cost. In some configurations, the applications 106 might be highlighted, branded, marked, or otherwise emphasized in as being available for free in the user interface shown to the customer 110.

Application developers 108 that participate in the program described herein may be compensated utilizing various mechanisms. For example, and without limitation, the usage of free applications 106 and IAP items 120 on customer devices 114 might be monitored using, for example, monitoring components 121. Application developers 108 might then be compensated based upon the usage of their applications 106 and IAP items 120 on the customer devices 114. As a specific example, the monetary rate at which a developer 108 is compensated by the application store 104 might be a function of the number of minutes or hours their application 106 or IAP 120 is utilized on customer devices 114 in a given time period (e.g. day, week, month, etc.).

The monetary rate at which a developer 108 is compensated may be the same across all application types and developers. Alternately, the rate at which a developer 108 is compensated might also be computed as a function of various factors, such as supply and demand. For instance, and as described briefly above, if many applications 106 of a certain type (e.g. weather applications) exist in the application store 104, the rate at which the developer 108 is compensated might be relatively low. If relatively few applications 106 of another type (e.g. karate games) exist in the application store 104, the compensation rate might be set higher in order to encourage the developer 108, and other developers, to submit applications 106 of that type to the application store 104.

In other configurations, the rate at which developers 108 are compensated for utilization of an application 106 might be based upon the time of day that the application 106 is utilized. For example, the developer 108 might be more highly compensated when the application 106 is used at night. In another configuration, the developer 108 might be compensated based upon the geographical locations in which an application 106 is utilized. For example, and without limitation, a higher level of compensation might be provided for use in certain countries. Other mechanisms might also be utilized to dynamically set the compensation rate for developers 108.

In some configurations, customers 110 that utilize free applications 106 and IAP items 120 might also be compensated based upon usage of the applications 106 and IAP items 120. For example, and without limitation, a customer 110 may be provided an amount of virtual currency for use on the application store 104 based upon the usage of free applications 106 and/or IAP items 120. The customer 110 can then redeem the virtual currency for non-free applications 106 and/or IAP 120 on the application store 104. Customers 110 may also be rewarded based upon their usage of free applications 106 and/or IAP items 120 in other ways in other configurations.

In order to determine the level of compensation for developers 108 (and potentially customers 110), an application signature or profile might be computed for applications 106 offered through the application store 104. For example, a histogram might be computed for each application 106 that reflects the usage of the application 106 by all customers 110. The signature or profile might also reflect the average usage over time or during different periods of time. For example, the signature or profile might reflect the usage by customers during different periods of the day over time.

Using an application "signature" or profile such as that described above, various insights may be had into the manner in which applications 106 are used. For example, an application 106 that provides information on current weather conditions might be used by a very large number of customers 110, but only for a very short period of time. In contrast, a game application 106 might be used by only a very small number of customers 110, but for long periods at a time. In this example, each of the applications might be utilized for approximately the same number of minutes each month, albeit by a greatly different number of users. Depending upon the type of application usage that the operator of the application store 104 would like to encourage, the compensation rate paid to the two developers might be varied. This information might also be utilized to determine the types of applications 106 that should be offered for free in the manner presented herein. It should be appreciated that this is only one example and that an application signature such as that described above might be utilized to set developer compensation and in other ways in other configurations.

Customers 110 might also be limited as to the quantity of IAP items 120 that they are permitted to utilize in some configurations. For example, and without limitation, a customer 110 might be limited as to the number of consumable IAP items 120 that they are permitted to obtain per specified time period. As another example, an in-application attribute (e.g. health in a game) may be varied inversely with the number of consumable IAP items 120 that a customer 110 obtains in a time period. These mechanisms may service to avoid unbalancing a game, for example, as a result of customers 110 obtaining too many consumables or other types of IAP items 120. Other mechanisms may also be utilized.

It should be appreciated that a developer 108 might be permitted to modify their designation of an application 106 or an IAP item 120 as being free. For example, a developer 108 might initially indicate that an application 106 or IAP item 120 is free, but later change their mind. In this case, the developer 108 might utilize the application store developer portal 118 to indicate that a fee is to be charged for the application 106 or IAP item 120. Thereafter, a customer 110 would no longer be permitted to utilize the application 106 for free. In this scenario, a message would be provided to the customer at the next launch of the application 106 indicating that the application 106 is no longer free to use. The customer 110 may however, be permitted to retain any IAP items 120 that were obtained for free.

In order to provide this functionality, various flags might be maintained by the application store system 102 indicating whether an application 106 and IAP items 120 are available for free or for a fee. Additionally, and as discussed briefly above, various checks might be made at the time a user browses the application store 104, requests an IAP item 120, or performs other actions to determine whether an application 106 or an IAP item 120 is free. For example, a determination might be made as to whether the customer 110 is utilizing a device 114 that is eligible to obtain free applications 106 and IAP items 120. If not, applications 106 and IAP items 120 might be offered to the customer only for a fee. Additionally, other types of flags might be maintained and other types of checks might be performed before allowing a user to download or utilize applications 106 or IAP items 120 for free including, but not limited to, the geographic location of the customer device 114 (i.e. customers 110 located in certain geographic locations might not be permitted to obtain applications 106 and IAP items 120 for free). Other checks might also be utilized.

In order to provide a notification to customers 110 that an application 106 is no longer available for free use, the applications 106 provided by the application store 104 might be "wrapped" with program code during ingestion by the application store 104. This program code may listen for events generated when the application 106 is launched. If the application 106 is no longer eligible for free use by the customer 110, this program code might present an informational message to the customer 110.

In some configurations, the application store 104 is also configured to provide a mechanism through which an application 106 can obtain the price of an IAP item 120 for display to the customer 110. In one configuration, this information is provided to the application 106 as a UNICODE text string. In order to allow the application 106 to provide a UI showing that an IAP item 120 is free, the application store 104 might return UNICODE text to the application 106 indicating the actual price of the IAP item 120 in strikethrough. For example, if the price of the IAP item 120 is typically $0.99, the application store 104 would return "$0.99" to the application 106. In this way, information can be conveyed to the customer 110 from within the application 106 that usual price for the IAP 120 does not apply and that this content is free.

It should be appreciated that the app store system 102 and the larger system 100 are only given by way of example. As will be described below, systems and techniques for managing the presentation of different version of additional content and prioritizing the presentation of application content and additional contents may be implemented in a computing environment that does not utilize a free or reduced fee app store.

Figure 2:
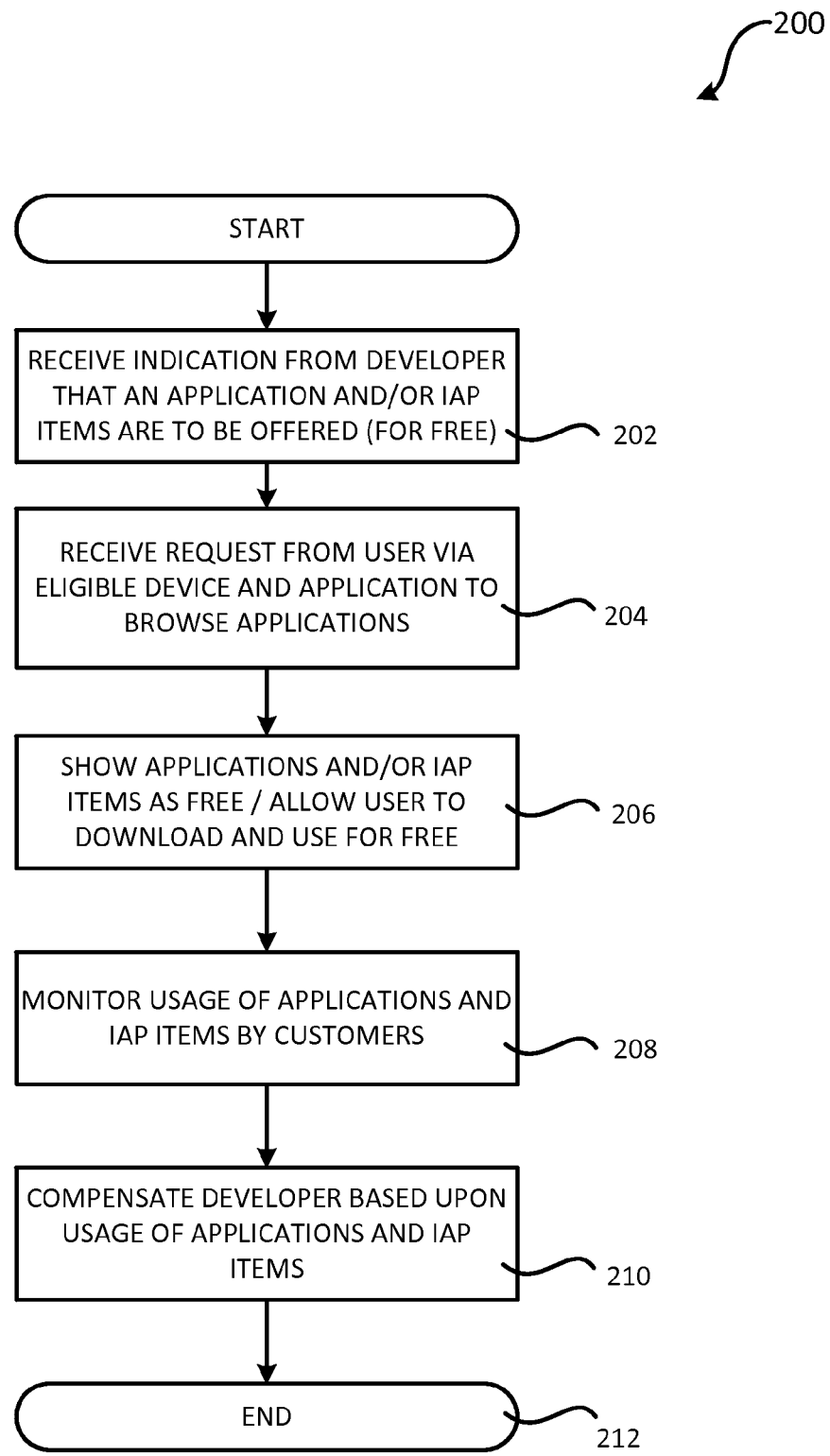
FIG. 2 is a flow diagram illustrating aspects of a routine disclosed herein for providing applications and IAP items.

FIG. 2 is a flow diagram illustrating aspects of a routine 200 disclosed herein for providing applications 106 and IAP items 120, and in some cases including for free or at a reduced cost in the manner described above. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where an application developer 108 provides an indication through an application store developer portal 118 that an application 106 is to be offered, and in some cases for free, through the application store 104. The developer 108 might also indicate that IAP items 120 associated with the application 106, which may also be offered for free.

From operation 202, the routine 200 proceeds to operation 204, where the application store 104 receives a request from a customer 110 from an eligible device and application to browse the applications 106 available from the application store 104. In response thereto, the routine 200 proceeds from operation 204 to operation 206, where the application store 104 causes applications and/or IAP items 120 to be displayed to the customer 110 on the customer device 114. As discussed above, a price for the applications 106 and IAP items 120 might also be displayed to the customer 110. Applications 106 and IAP items 120 that the respective developer has indicated should be free may be indicated as such, in some aspects. The customer 110 may then download and utilize the applications 106 and/or IAP items 120, such as without incurring any charge.

From operation 208, the routine 200 proceeds to operation 210, where the application store 104 may monitor the usage of applications 106 and/or IAP items 120 that have been provided to customer devices 114. Various mechanisms might be utilized to monitor the usage of the applications 106 and/or IAP items 120. For example, and without limitation, the customer device 114 may report the usage time for an application 106 or IAP item 120 back to the application store 104. Other mechanisms may also be utilized.

From operation 208, the routine 200 proceeds to operation 210, where the application store 104 monetarily compensates the developer 108 for the usage of the application 106 and/or the IAP items 120 based upon the usage computed at operation 208. For example, and without limitation, the application store 104 might monitor usage of the application 106 and/or IAP items 120 over the course of a month or other time period. The developer 108 might then be compensated based upon the number of hours that the application 106 and/or IAP items 120 were utilized on customer devices 114 during that time period. The monetary rate at which the developer 108 is compensated (e.g., the monetary fee per hour, minute, or other time period) may be computed using the various mechanisms described above. From operation 210, the routine 200 proceeds to operation 212, where it ends.

Thus, as set forth above, applications and/or IAP items may be provided for free or at a reduced cost using techniques such as those described with reference to FIG. 2. Some example techniques for presenting application content and additional content will now be described below with reference to FIGS. 3-8. The techniques described below may sometimes be employed in scenarios when applications and/or IAP items may be provided for free or at a reduced cost. However, there is no requirement that the following described techniques must be used in such scenarios, and the following described techniques may be used in other scenarios, such as when applications and/or IAP items are provided at full non-discounted costs. Accordingly, it is understood that the techniques forth above for providing applications and/or IAP items free or at a reduced cost are non-limiting and are included merely as an example scenario in which the following techniques may be employed.

Figure 3:
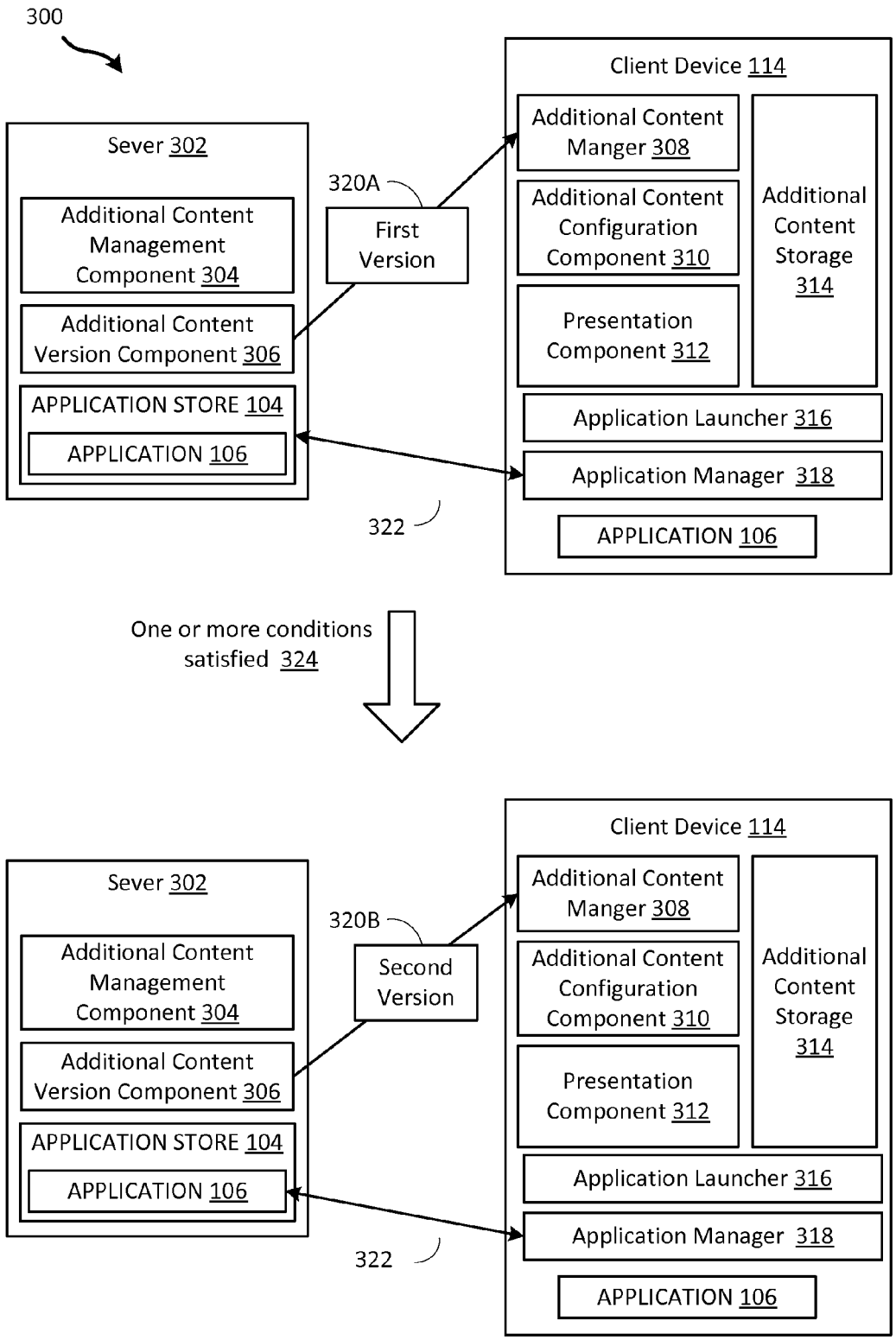
FIG. 3 is a diagram illustrating an example system for presenting application content and additional content that may be used in accordance with the present disclosure.

With reference to FIG. 3, an example system 300 for presenting application content and additional content is illustrated. The system 300 may include one or more servers 302 in communication with one or more client devices 114 via one or more network connections or communication links. Server 302, which may include one or more various computing devices, may provide or be associated with the application store 104 as described above. The application store 104 may be configured to communicate one or more applications 106 to client device 114 upon request via link 322, and may present a selection interface of applications 106 of IAP items 120, etc., to one or more client devices 114.

In some examples, the server 302 may include an additional content management component 304. The additional content management component 304 may generate, gather, receive, and/or manage additional content, such as advertisements, notifications, promotions, etc. In some examples, the additional content may originate from another device or server (not shown), and may be communicated to the server 302 via one or more network connections or communication links. In other examples, the additional content management component 304 may generate or gather some or all of the additional content, for example, in association with an e-commerce system 122, which may also be provided by server 302. In any of the above scenarios, the additional content management component 304 may communicate the additional content to an additional content version component 306. The additional content version component 306 may determine and/or adjust one or more versions of the additional content for transmission to one or more client device 114 for presentation.

The client device 114 may include a number of components for managing, presenting, and storing additional content, as well as components for managing, launching, and presenting applications. In one example, as illustrated, the client device 114 may include an additional content manager 308, an additional content configuration component 310, a presentation component 312, which may include any of a screen, touch screen, audio output devices (e.g., speakers), and the like, additional content storage 314, an application launcher 316, and an application manager 318.

The additional content manager 308 may receive additional content from the server 302. In some examples, the received additional content may include a first version 320A and a second version 320B (collectively referred to hereinafter as additional content 320). The first version 320A of the additional content may, for example, have a reduced file size, may include less data and/or require less storage capacity than the second version 320B of the additional content. In some cases, the second version 320B of the additional content may have a higher fidelity (e.g., visual, graphical, video, and/or audio fidelity) than the first version 320A of the additional content. For example, upon being retrieved over a network, the second version 320B of the additional content may have a higher fidelity than the first version 320A of the additional content. In some examples, the second version 320B of the additional content may be transmitted using a higher encoding bitrate and/or a higher proportion of forward error correction that the first version 320A of the additional content. Also, in some examples, the second version 320B of the additional content may have a lower resolution and/or lower audio fidelity than the first version 320A of the additional content. Furthermore, in some cases, the second version 320B of the additional content may include added content that is not included in the first version 320A of the additional content, such as additional or more detailed graphics, interactive elements, video or higher resolution video, higher resolution images, audio or higher fidelity audio, etc.

In some examples, the additional content manager 308 may download and store the first version of additional content 320A in the additional content storage 314. As will be described in detail below, in some examples, the second version 320B of the additional content may be downloaded if and/or when one or more conditions for retrieving the second version 320B are satisfied (as indicated by operation 324 in FIG. 3).

From time to time, the client device 114 may request and subsequently download an application 106 via link 322 from the application store 104. The application manager 318 may receive/direct the downloading of the application 106. The client device 114 may receive an instruction to launch the application 106, for example via one or more input devices (not shown) of the client device 114. In response to the instruction, the application manager 318 may instruct the application launcher 316 to begin launching the application 106. This event may trigger the additional content manager 308 to access additional content for presentation via presentation component 312, for example, during the time that the application 106 is launching or initializing. In some examples, launching may include loading one or more components of the application 106, updating content information, e.g., via communication with the server 302, and various other operations as are known to those skilled in the art. In some examples, during the launch period or any portions thereof, the additional content manager 308 may instruct the presentation component 312 to display additional content, such as advertisements and notifications. In some cases, the launch period may be known or discoverable, for example by the application launcher 316 or application manager 318. In other cases, the time to launch may be estimated, for example based on previous launches of that application 106, launch times of similar applications, and so on.

In addition to launching of an application, other events may trigger the presentation of additional content, such as designated points or breaks in application content or other content being presented via presentation component 312 on client device 114. For example, the presentation of additional content may be triggered during designated points in the presentation of an application (e.g., reaching or passing a certain level in a game) or based on other factors associated with the content being presented on the client device 114. In some examples, additional content may be presented on the client device 114 at regular or configurable intervals or in response to occurrence of selected events.

In some cases, the client device 114 may lose connection with the server 302 or other network devices or the connections may degrade to hinder or prohibit communication of additional content to the client device 114 (e.g., one or more connection quality metrics drops below a threshold). In order to address and other concerns, additional content may sometimes be transmitted to the client device 114 when the connection with server 302 has an acceptable quality or is above a certain threshold, for use at a later time. The additional content transmitted during these periods may be first version 320A, which may have or be associated with a lower fidelity version of additional content, for example that is smaller in size and requires less storage capacity on the device 114, for example in additional content storage 314. In some examples, the additional content version component 306 of server 302 may configure or modify additional content received from the additional content management component 304 to have a lower fidelity or contain less information. The client device 114 may receive and store the low fidelity version of the additional content 320 in the additional content storage 314 until the occurrence of an event where the additional content 320 may be presented.

In some cases, where, for example, the client device 114 loses network connection with the server 302 or the quality of the communication link degrades beyond a threshold (e.g., reduced bandwidth), the client device 114 may access the lower fidelity version of additional content 320 from storage 314 and present the additional content via presentation component 312. In some cases, this may be in response to one of a variety of events, such as opening or launching an application 106, (e.g., provided by or obtained from the application store 104 via link 322). The additional content in this case may be, for example, pre-stitial content. In other cases, other events may trigger the presentation of additional content, such as designated points or breaks in other content being presented via presentation component 312 on client device 114 or user interactions with a running application 106. In some cases, to prevent older versions or outdated versions of additional content from being presented to a user, additional content items may be associated with an expiration point. The expiration point may be specific a date and time, or may specify a threshold time period within which the additional content may be displayed, for example, measured from the time the additional content is transmitted to the client device 114.

In one example, a client device 114 may be traveling with no network connection, such as on a bus. The client device 114 may have previously downloaded content including video, such as a movie. During the presentation of the content, the additional content manager 308 and/or the additional content configuration component 310 may instruct the presentation component 312 to display additional content, for example at regular or configurable intervals. This may add value and generate revenue, for example, for content providers by enabling presentation of advertisements and promotions during times of poor or no network connectivity with devices 114.

In another example, the commination link between the client device 114 and the server 302 may support obtaining a second version 320B of the additional content, such as higher fidelity content, at a time when the additional content manager 308 and/or additional content configuration component 310 determines to present additional content. In this scenario, the client device 114 may monitor and detect the occurrence of at least one condition for retrieving the second version 320B of the additional content at operation 324. In this case, the second version 320B of the additional content may be requested and received from server 302, and presented by the presentation component 312. However, if one or more conditions for retrieving the second version 320B are not satisfied, the client device 114 may present the first version 320A (e.g., lower fidelity additional content) accessed from additional content storage 314.

The one or more conditions for retrieving the second version of additional content may include, for example, at least one of an available network available network connection or meeting specified criteria related to one or more of network connection quality, amount of available bandwidth, amount of available processing resources, amount of available memory resources, device settings, or device characteristics. In this way, the presentation of additional content may be enabled regardless of whether a connection to a network device or server 302 is available and may be tailored to present a better user experience when more related resources are available.

In some examples, the server 302, via the additional content version component 306, may modify the additional content, for example, to conform with capabilities/resources of the client device 114 and/or to enhance the user experience of additional content and/or applications 106. Additionally or alternatively, the client device 114, via the additional content configuration component 310, may modify the additional content for presentation, for example, to ensure the additional content does not interfere with launching an application 106, to accommodate other resource limitations, bandwidth limitations, and/or to enhance the user experience. The server side manipulation of additional content may be based on, for example, characteristics of a group of client devices 114 (e.g., smart phones, smart phones utilizing a specific operating system, tablets, etc.) or a particular client device 114. Additionally, in some examples, client device side manipulations of additional content may be performed, for example, based on dynamic or real time considerations, such as resource usage.

In some cases, server side manipulation or configuration of additional content may include removing or reducing aspects of the additional content, such as reducing the resolution of high resolution images or video, rich text, removing audio component(s) of the additional content, etc. In some examples, this may include encoding the additional content at a lower bit rate, or with less forward error correction. In some cases, the additional content management component 304 may generate versions of additional content (in some cases multiple versions for one item of content having different sizes or characteristics) based on capabilities or resources of a particular client device 114.

In one example, the server 302 may detect or obtain information from the client device 114 indicating that the presentation component 312 does not include an audio output device. In this scenario, the additional content management component 304 may remove audio data from the additional content, thus reducing the size of the additional content 320, while not detracting from the user experience of the additional content on device 114.

In another example, the additional content management component 304 may determine or detect that client device 114 does not have a graphic processing unit (GPU). In this case, the additional content management component 304 may remove video components that require a GPU for presentation, thus reducing the file size of the additional content, while not detracting from the user experience of the additional content. In other aspects, the additional content management component 304 may detect or determine other limitations in the video capabilities, memory resources, processing resources, etc., of the client device 114, and modify the additional content accordingly.

In the above examples, the additional content management component 304 may modify the content based on characteristics of the client device 114 and/or characteristics of the content. In some examples, the additional content management component 304 may first remove or modify aspects of the additional content that will not result in a significant negative impact to the presentation of the additional content on the client device 114. Next, in some examples, the additional content management component 304 may further modify the additional content to further reduce the quantity of data associated with the additional content, while still attempting to allow the presentation of the additional content to result in a positive user experience.

In some examples, client side manipulation or configuration of additional content for presentation may be directed or determined by the additional content configuration component 310 and/or the additional content manager 308. The additional content configuration component 310 may determine to dynamically replace portions of the additional content with higher fidelity versions of additional content received from the server 302, such as by replacing text overlays. Additionally or alternatively, the additional content configuration component 310 may develop some of the additional content itself, for example by creating a three-dimensional scene (video or image), thus reducing the required bandwidth to obtain the additional content. These determinations may be based on one or more factors, such as available processing (e.g., capabilities of the central processing unit (CPU)) or memory resources, requirements for launching the application and potential resource conflicts, etc). In some cases, for example, the launching or execution of an application 106 may require bandwidth resources, for example when obtaining information from server 302. This limitation on bandwidth resources may factor into the determination of whether to present higher fidelity additional content, for example, if obtaining the higher fidelity version of additional content would interfere with initializing the application 106.

In some cases, the additional content configuration component 310 may reduce the number of additional content items presented or lower the quality of the additional content items by further reducing resolution, or removing different portions of the additional content 320, for example, when resources are substantially limited. In some cases, the additional content configuration component 310 may determine which additional content items to present, and in what order, based on rights of developers of the additional content (e.g., price paid), and the like.

In some examples, the determination to modify additional content may further be based on the amount of time that it is expected to take to launch the application 106. For example, in some cases, each additional content item stored in storage 314 may be associated with a length value, e.g., in seconds. The additional content configuration component 310 and/or the additional content manager 308 may match available pieces of additional content stored in storage 314 to the allotted time for launching of the application 106. In some examples, matching may include selecting one or more items of additional content with a sum length equal to or approximately equal to the allotted time (e.g., within a configurable error margin). In some examples, the application launcher 316 may estimate or determine the time that it will take to launch the application, and communicate this information to the additional content configuration component 310 and/or the additional content manager 308, to enable the above determination.

In some cases, the additional content configuration component 310 may generate different versions of the same additional content, for example, to vary the user experience when the same additional content is repeatedly presented on a frequent basis (e.g., when there is no network connection available).

Figure 4:
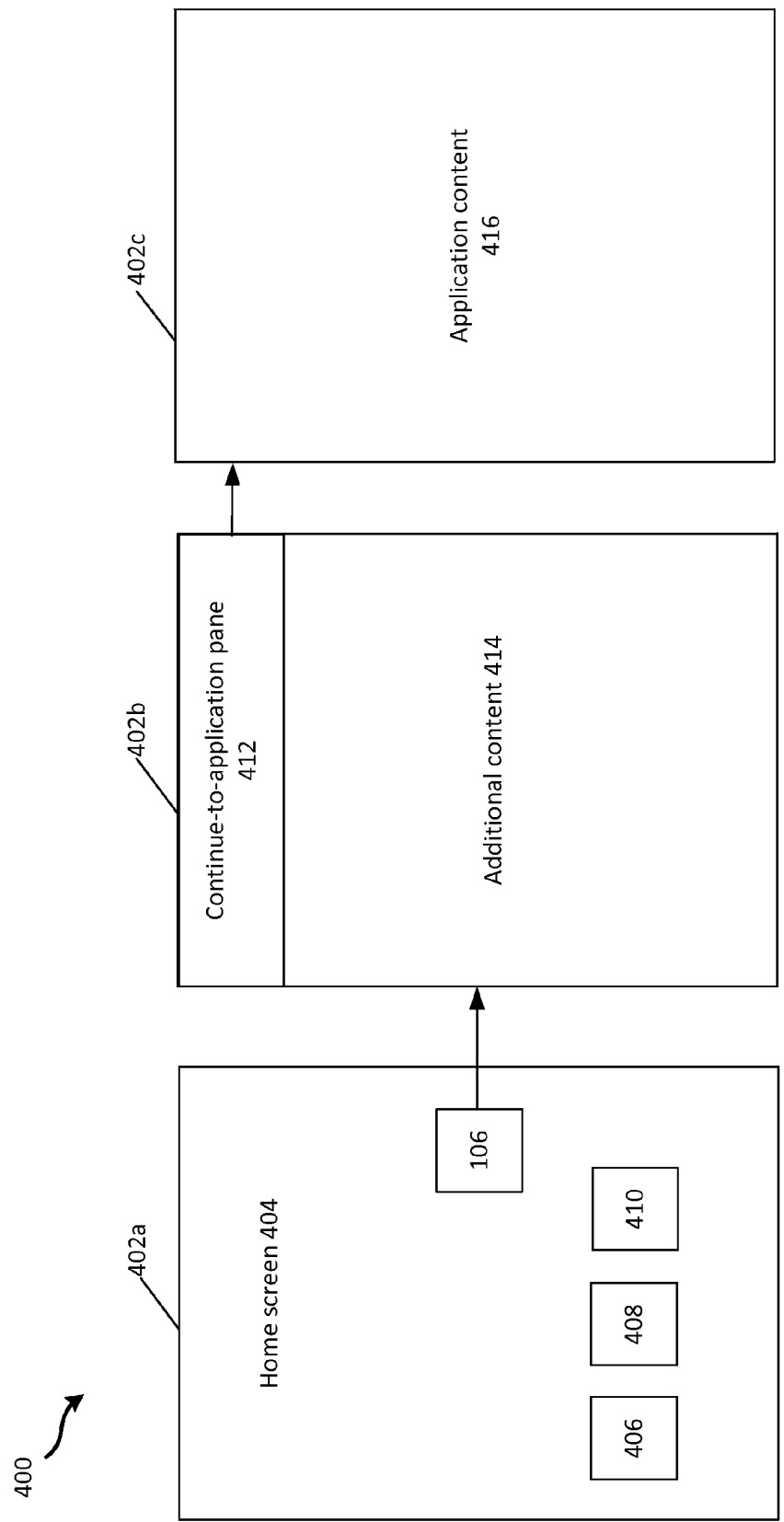
FIG. 4 is a diagram illustrating an example user interface for display on a client device that may be used in accordance with the present disclosure.

FIG. 4 illustrates an example user interface 400 for display on a client device 114, such as provided by presentation component 312. The device 114 may provide screens 402, for example, for the presentation of content, such as application content and additional content.

In the example illustrated, screen 402a may display an application 106, which, has been downloaded and installed on the customer device 114 (e.g., from application store 104), as indicated by an icon for application 106 being displayed on a home screen 404 of the customer device 114. Icons for other applications 406-410 are also shown on the home screen 404. In some examples, application 106 may be launched for execution by selecting the icon for application 106, such as by touching the icon or clicking on the icon with an attached mouse.

In some examples, additional content 414 (e.g., advertisements, notifications, promotions, etc.) may be inserted for display into a display area associated with an executing application 106, as illustrated in screen 402b. Specifically, in some examples, this inserted or additional content 414 may include advertising or promotional content that may provide additional revenue for the application store and/or application developers. In some examples, the inserted or additional content 414 may be received from the application store 104, server 302, or other networked devices.

In some examples, inserted additional content 414 may at least temporarily inhibit (e.g., interrupt, delay, overlay, block, reduce, or otherwise inhibit) at least part of a display of application content associated with the application 106. For example, in some cases, the additional content 414 may be displayed as pre-stitial content immediately, or soon, after launching of an application 106 is requested. As shown in FIG. 4, launching of application 106 may cause customer device 114 to display, via screen 402b, example additional content 414.

As also shown in FIG. 4, a continue-to-application pane 412 may be displayed by the customer device 114 in screen 402b, such as above the additional content 414. In some cases, a user may tap or otherwise select the continue-to-application pane 412 in order to remove the display of the additional content 414 and continue to a display of application content 416, as illustrated in screen 402c. Thus, as shown in FIG. 4, additional content 414 may temporarily inhibit the display of application content 416 by obstructing and/or delaying the display of application content 416. In some examples, a continue-to-application pane 412 may be turned off or not displayed, for example, to enable presentation of the entire additional content 414. This may be the case, for example, when an additional content developer or promoter pays a premium to have the additional content 414 displayed without interruption. In some examples, this may include presentation of all portions of the additional content 414 even though the application 106 is ready to display application content. This implementation will be described in greater detail below in reference to FIGS. 7 and 8.

While user interface 400 is described in relation to the launching of an application 106, it should be appreciated that the same type of interface/functionality may be provided when additional content is displayed during the presentation of other content, during the running of application 106, and so on.

Figure 5:
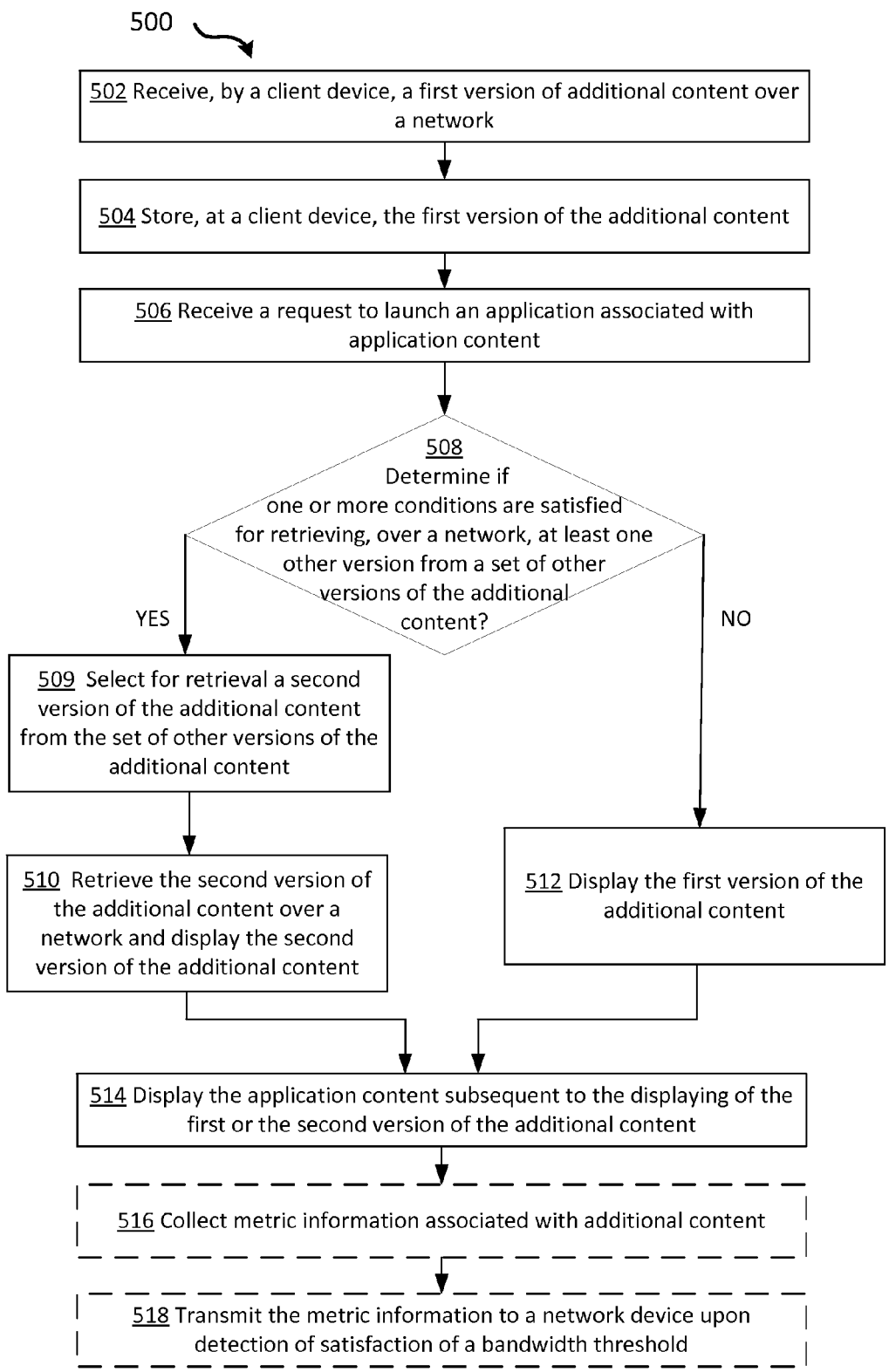
FIG. 5 is a flow diagram illustrating an example process for presenting application content and additional content that may be used in accordance with the present disclosure.

With reference to FIG. 5, a process 500 for presenting application content and additional content is shown. Process 500 may begin at operation 502, where a first version of additional content may be received over a network, for example, by client device 114. As set forth above, the first version may include, for example, a lower fidelity version of the additional content. Operation 502 may be performed when a sufficient network connection with a server 302 or other additional content provider is available, such as a connection that enables transmission of content. It is noted that the term version, as used herein, refers to a collection of information. In some examples, the first, second and/or other versions of additional content may include the same, or similar, content with different levels of fidelity. However, there is no requirement that the first, second and/or other versions must include the same or similar content. In some examples, the first and second versions of additional content may include partially or entirely different content with respect to one another. For example, the first version of additional content may be an advertisement for toothpaste, while the second version of the additional content may be an advertisement for an airline. Accordingly, different versions of additional content may include both technical and/or creative differences with respect to one another.

At operation 504, the client device 114 may store the first version of additional content, for example, in additional content storage 314. At operation 506, the client device 114 may receive a request to launch an application 106 associated with application content. Next, the client device 114 may determine, at operation 508, whether one or more conditions have been satisfied for retrieving, over a network, at least one other version of the additional content from a set of other versions of the additional content. As set forth above, the one or more conditions may include, for example, at least one of an available network connection or meeting specified criteria related to one or more of network connection quality, amount of available bandwidth, amount of available processing resources, amount of available memory resources, device settings, or device characteristics. Device characteristics may include characteristics such as screen size, whether the device includes audio speakers, and characteristics of other components that are available to the device. Device settings may include settings such as whether the device is in portrait or landscape mode, whether the device's speakers are turned on or off, and settings of other components that are available to the device.

In some examples, the set of other versions of the additional content may include other versions of the additional content that are made available by a server for download to the client device. The server may sometimes send to the client device a listing of the multiple available versions in the set of other versions of the additional content. Also, in some examples, the server may indicate one or more conditions that are required for downloading of each of the other available versions of the additional content. The client may then determine these conditions by receiving the condition information provided by the server. Also, in some examples, the server may indicate relative or other characteristics of each of the multiple available versions, such as their data size, fidelity (e.g., visual, graphical, video, and/or audio fidelity), resolution, transmission characteristics (e.g., encoding bitrates, amount of forward error correction), whether they include video, audio, and/or other types of data, and other characteristics. The client device may then use this characteristic information to determine conditions that are required for retrieving each of the other available versions of the content. For example, if a particular available version has a particular data size, then the client may use this information to determine an amount of available bandwidth required to retrieve the particular available version. As another example, if a particular available version includes audio data, then the client may determine that audio speakers are required to present the particular available version.

In some examples, operation 508 may be performed based, at least in part, on receiving the application launch request at operation 506. In some examples, the client may determine, at operation 508, that conditions are satisfied for retrieving any of multiple other versions of the additional content. In these examples, the client device may select one of the multiple versions for retrieval and display, as will be described in greater detail below with respect to operation 509.

If, at operation 508, the client device 114 determines that the one or more conditions are not satisfied for retrieving any of the other versions from the set of other versions of the additional content, then the client device 114 may display the first version of the additional content at operation 512.

If, however, at operation 508, the client device 114 determines that the one or more conditions are satisfied for retrieving at least one other version from the set of other versions of the additional content, then the client device 114 may select for retrieval a second version of the additional content from the set of other versions of the additional content at operation 509. In some examples, the second version of the additional content may be selected for retrieval at operation 509 based, at least in part, on the one or more conditions described above. For example, in some cases, it may be determined that conditions are satisfied for retrieving only one particular other version of the additional content. In these examples, that particular version may be selected for retrieval as the second version of the additional content.

On the other hand, in some other examples, it may be determined that conditions are satisfied for retrieving any of multiple other versions of the additional content. In these examples, one of the multiple versions may be selected for retrieval as the second version of the additional content. For example, in some cases, a set of other versions of additional content may include three versions: Version A, Version B and Version C. Version C is the highest fidelity version and includes the most data. Version B is the second highest fidelity and includes the second most data. Version C is the third highest fidelity and includes the third most data. At operation 508, it may be determined that conditions are satisfied for retrieving either Version A or Version B but that conditions for retrieving Version C are not satisfied. This may be because, for example, the amount of data in Version C exceeds the amount of data that can be downloaded within a given time period using the network bandwidth that is available to the client device. Thus, at operation 510, that client device may choose between Version A and Version B by selecting either Version A or Version B as the second version for retrieval and display at the client device. In some cases, the client device may select the highest fidelity version for which retrieval conditions are satisfied. Using these criteria, the client device would select Version B because it has a higher fidelity than Version A.

Thus, as set forth above, a version for retrieval may sometimes be selected based, at least in part, on its fidelity relative to other versions. However, various additional or alternative criteria may also be employed. For example, a version for retrieval may sometimes be selected based, at least in part, on factors such as the types of data included in each version (e.g., video, audio, etc.), the resolution of each version, the amount of data included in each version, the type or amount of added data in each version relative to the first version of the additional content, the relative popularity of each version, the relative amounts of compensation being paid to advertise each version, and many other factors. Additionally, the version for retrieval may also be selected based on characteristics and/or settings of the client device. For example, in some cases, if a particular version includes audio data but the client device does not include speakers, then that particular version may sometimes be given a lower selection priority than other versions that do not include audio data. As another example, if a particular version includes a resolution or is designed for a screen size that is bigger than the client device's screen size, then that particular version may sometimes be given a lower selection priority than other versions that are better suited for display the client device's display screen. It is noted that any combination of these or other factors may be employed using any combination of relative weights being applied to different factors.

At operation 510, the second version of the additional content (i.e., the version selected at operation 509) is retrieved over a network and displayed. In some examples, the second version of additional content may include a higher fidelity version of the content (e.g., a fidelity that is higher than the fidelity of the first version). Also, in some examples, the second version may comprise at least some added content that is not included in the first version of the additional content. The added content included in the second version may include, for example, additional and/or more detailed graphics, additional interactive features, an extended time duration due to added content, higher resolution video or images, etc. In some examples, the second version of content may be transmitted using at least one of a higher encoding bitrate than the first version or a higher proportion of forward error correction that the first version and/or may otherwise be associated with a higher fidelity than the first version.

In some examples, the additional content configuration component 310 may request and obtain the second version of the additional content from the server 302. Additionally or alternatively, the additional content configuration component 310 may modify the first version additional content, for example, by adding additional content or enhancing the content in a variety of ways, as described above. In some cases, this may include replacing the first version of the additional content in its entirety, replacing one or more portions of the first version of additional content, and/or adding additional content or types of content to the first version.

Subsequent to displaying of either the first version (operation 512) or the second version (operation 510) of the additional content, the client device 114 may display the application content associated with the application 106 at operation 514. As set forth above, in this way, different versions of pre-stitial additional content or advertising may be displayed while an application is launching, based on, for example, resources available to the client device 114 and whether the client device has a sufficient network connection.

In some implementations, process 500 (and also, in some cases, process 600 of FIG. 6) may also include collecting metric information associated with the additional content at operation 516. The metric information may include, for example, an identification of the particular additional content that is displayed and an indication of the particular version of the additional content that is displayed, viewership information, interaction information (e.g., associated with interactive additional content), and the like. The client device 114 may transmit the metric information to the server 302 or other network device upon detection of satisfaction of an available bandwidth and/or network quality threshold at operation 518. In some examples, the metric information may be collected when the device 114 is not connected to a network. In this way, the metric information may be saved and sent to a network device at a later time, for example when connected. The metric information may be used, for example, to determine what to charge for display of additional content, to determine which types, versions or other variations of additional content to use or not use, to improve and expand user interaction with additional content, to compensate developers, and for other reasons.

Figure 6:
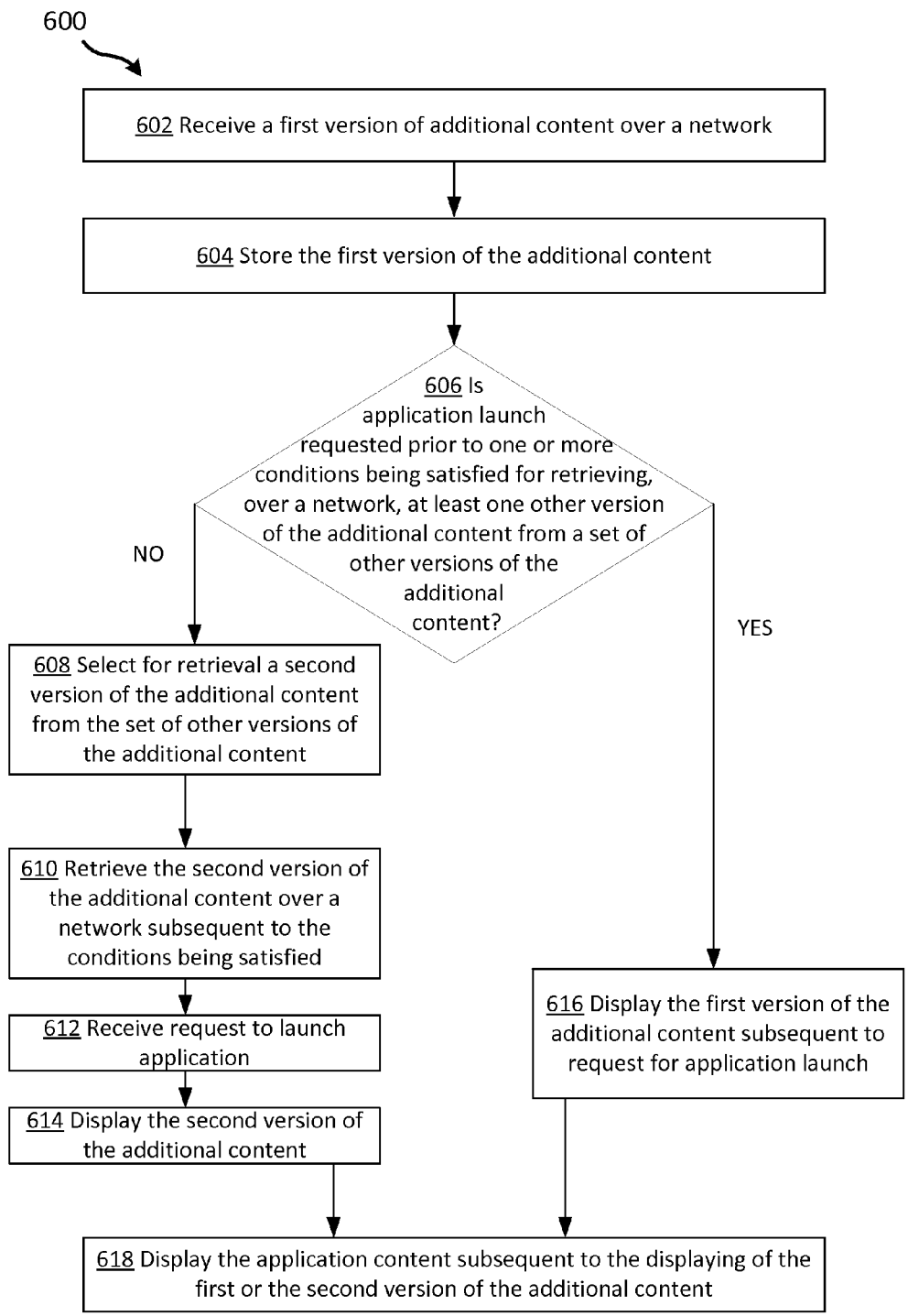
FIG. 6 is a flow diagram illustrating another example process for presenting application content and additional content that may be used in accordance with the present disclosure.

With reference to FIG. 6, a process 600 for presenting application content and additional content is shown. Process 600 may begin at operation 602, where a first version of additional content may be received over a network, for example, by client device 114. The first version may include, for example, a lower fidelity version of the additional content. Operation 602 may be performed when a sufficient network connection with a server 302 or other additional content provider is available, such as a connection that enables transmission of content. At operation 604, the first version of additional content may be stored, for example, for accessing/presenting at a future time. In some cases, the first version may be stored in additional content storage 314, which may sometimes be part of or included in general storage resources or memory of the client device 114.

Next, at operation 606, it may be determined if an application 106 launch has been requested prior to one or more conditions being satisfied for retrieving, over a network, at least one other version of the additional content from a set of other versions of the additional content. In some examples, the one or more conditions may include the conditions described above in reference to operation 324 of FIG. 3. The one or more conditions may include, for example, at least one of an available network connection or meeting specified criteria related to one or more of network connection quality, amount of available bandwidth, amount of available processing resources, amount of available memory resources, device settings, or device characteristics If it is determined, at operation 606, that no request to launch an application 106 has been received prior to satisfaction of the one or more conditions, then a second version of additional content from the set of other versions of additional content may be selected for retrieval at operation 608. Various techniques for selecting for retrieval a second version of additional content from the set of other versions of additional content are described in detail above with respect to operation 509 of FIG. 5 and are not repeated here. The second version of additional content may include, for example, a higher fidelity version of the content (e.g., a fidelity that is higher than the fidelity of the first version). Also, in some examples, the second version may comprise at least some added content that is not included in the first version of the additional content. In some examples, the second version of content may be transmitted using at least one of a higher encoding bitrate than the first version or a higher proportion of forward error correction that the first version and/or may otherwise be associated with a higher fidelity than the first version. Examples of such added content are described above and are not repeated here. A request to launch an application 106 may be received at operation 612 and the second version of the additional content may be displayed at operation 614.

If, on the other hand, it is determined, at operation 606, that a request to launch an application 106 has been received prior to satisfaction of the one or more conditions, then the first version of additional content may be displayed subsequent to receiving the request for application launch at operation 616. In some cases, the first version may be displayed during a time when the application 106 is initializing (e.g., before the application 106 provides application content for display).

Subsequent to displaying of either the first version (operation 616) or the second version (operation 614) of the additional content, application content associated with the application 106 requested to be launched may then be displayed at operation 618. In this way, different versions of pre-stitial additional content or advertising may be displayed while an application is launching, based on, for example, resources available to the client device 114 and whether the client device has a sufficient network connection.

It is noted that, in some examples, after a decision has been made to retrieve and display a second version of the additional content, there may be certain problems or other conditions that may arise and may result in a different course of action. For example, in some cases, during the process of downloading the second version of the additional content, the client device may lose network connectivity or may otherwise experience a significant reduction in available network bandwidth. In these and other cases, the client device may sometimes make a decision to stop presenting the second version of the additional content and to instead retrieve the first version of the additional content from local storage and display the first version.

Additionally, in some cases, even when a decision has been made to retrieve and present a second version of the additional content, a client device may still decide to wholly or partially present the first version of the additional content. For example, in some cases, the client device may decide to present at least part of the first version of the additional content while the second version of the additional content is being downloaded over a network. Once a desired portion of the second version of the additional content has been downloaded to the client device, the client device may begin to present the second version of the additional content in place of (or in addition to) the first version.

It is further noted that, while FIGS. 5 and 6 refer to a set of other versions of additional content, the disclosed techniques may also be employed in scenarios in which only a single version of other content is made available. In these cases, if conditions are satisfied for retrieving the single other version of the additional content, then that version of the additional content may sometimes be retrieved automatically without the need to select that version of the additional content.

Figure 7:
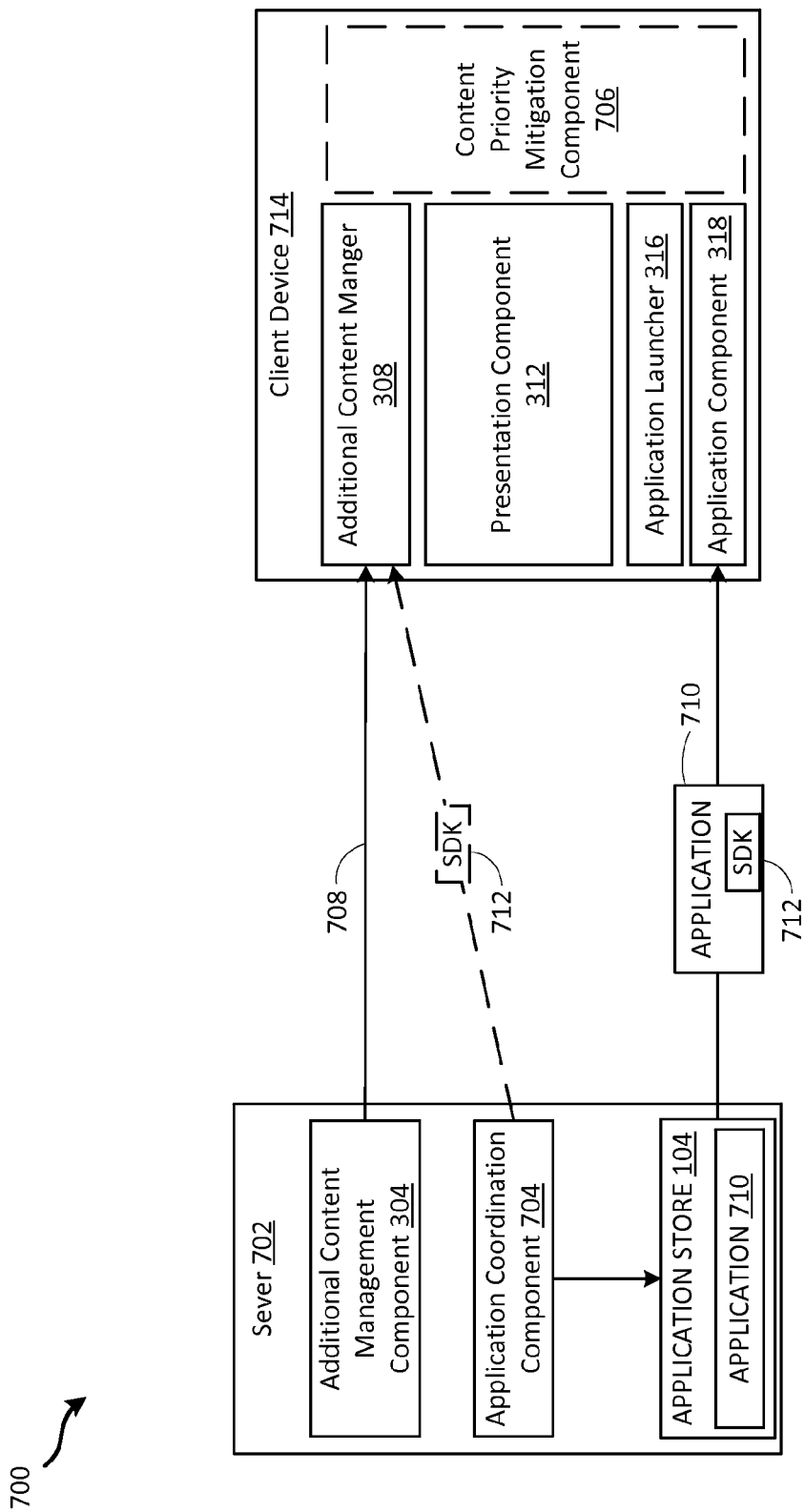
FIG. 7 is a diagram illustrating an example system for managing priorities for presenting application content and additional content that may be used in accordance with the present disclosure.

FIG. 7 is a diagram illustrating an example system 700 for managing priorities for presenting application content and additional content that may be used in accordance with the present disclosure. As shown, system 700 includes sever 702, which may include one or more aspects of server 302 described above, such as an additional content management component 304 and an application sore 104. In some examples, the server 702 may also include an application coordination component 704, which may provide instructions to client device 114 to prioritize the display of additional content in relation to application content. The client device 714 may include one or more aspects of client device 114 described above and may, additionally or alternatively, include a content priority mitigation component 706. It should be appreciated that one or more aspects of system 700 may be combined with one or more aspects of system 300, for example, utilizing processes 500 and/or 600, to enable presentation of different versions of additional content.

In some cases, it may be beneficial to control when additional content may be displayed on a client device 714, and more particularly, when the presentation of the additional content has priority over presentation of application content associated with one or more applications. This may include instructing an application, such as application 710, to delay or refrain from presenting content on the client device 114 when additional content is being displayed, for example, during a time when the application is launching or initialing and the additional content is displayed as pre-stitial content. These control techniques may also be used, for example, during run time of an application 710 when the additional content is displayed as inter-stitial content. It is further noted that the described control techniques are not limited to display of additional content in association with applications and may also be used to display additional content in association with other types of content, such as streaming movies, games, and other content.

In some examples, a source or provider of the additional content may set, request or obtain various limitations on presentation of the additional content. These limitations may include, for example, a requirement that the full additional content be presented without interruption, or other such restrictions. In some examples, the additional content source or provider may pay an extra or premium fee for additional content to be presented in accordance with such limitations. Also, in some examples, different applications 710 may be configured with similar restrictions or priority schemes for presentation of additional content. In these examples, the restrictions or priority information may be provided to the application coordination component 704. In one example, the application coordination component 704 may send a software development kit (SDK) 712 or other instruction set to the client device 714. The SDK 712 may include instructions for the client device 714 to prioritize certain additional content, for example, over or in relation to application content. In some examples, SDK 712 may enable the client device 714 to associate, install, and configure a content priority mitigation component 706 that may monitor and enforce content presentation priorities, for example with respect to certain additional content providers, certain applications 106, etc. In some examples, the SDK 712 may instruct the client device 714 to make additions or modifications at the operating system level to assist in enforcing content presentation priorities as described herein.

In one example, the additional content manager 308 may receive additional content 708 for presentation, for example, from the server 702. Upon occurrence of a trigger event, such as the launching of an application (which may detected by the additional content manager 308 or communicated by the application launcher 316 or application manager 318), or other triggers as described above, the additional content manager 308 may select and send additional content to the presentation component 312 for presentation. The content priority mitigation component 706 may intercept the additional content and determine, based on priority information associated with the additional content and/or the application, which content will be presented, in what order the content will be presented, and other priorities for presenting the content.

In some examples, the application coordination component 704 may instruct the application store 104 to associate priority information or instructions with one or more applications 710. This may include, for example, embedding into the application 710 an SDK 712 that may enable the application to implement delay or hold instructions from the client device 714 while the additional content is being presented. In one example, the delay or hold instructions may include instructions to delay or hold presentation of application content associated with the application until display of the additional content is completed. In another example, the delay or hold instructions may include instructions to stop launching the application 710 if resources are limited on the client device 714 such that launching the application 710 would prevent, delay or degrade the presentation of the additional content during launching of the application. In some cases, the additional content manager 308 may make a determination as to the available resources of client device 714 and indicate any substantial resource limitations to the application manager 318 or launcher 316.

In some cases, the content priority mitigation component 706 may detect that an application 710 has SDK 712 and may cooperate with the application 710 to employ available resources on the client device 714 so that the application 710 may launch in the background, while additional content is presented without inference. In cases where the content priority mitigation component 706 detects that an application does not have the SDK 712, it may instruct the application 710 to delay launching until the additional content presentation is finished or does not require significant resources, etc. In some examples, the client device 714 may detect resource requirements for an application 710 and determine if any actions are needed to ensure uninterrupted presentation of the additional content.

In some examples, the additional content may include one or more interactive elements, for example, that upon receipt of a user selection or input, may display other content, such as a link to another application. For example, the link may be a link to a webpage to purchase an advertised item, a link to interact with a demonstration of an advertised game, or other content. In these scenarios, the content priority mitigation component 706 may pause launching of an application 710 until, for example, the presentation of the linked content is finished or until inputs are received indicating that the user wishes to return to the paused launching application 710.

In some cases, enforcement of content prioritization may be performed, at least in part, external to the client device 714, such as by the server 702, application store 104, or other network device. Enforcement of content presentation priorities may, in some cases, enable an enhanced user experience, for example, potentially allowing the application to at least partially load during presentation of additional content, and by potentially allowing the additional content to be presented without experiencing interference from the application 710, such as pop up messages, audio content, etc. In some cases, the application 710 may require resources that, if utilized by the application 710, would detract from the presentation of additional content, such as by causing interruptions or reduced quality. The content prioritization scheme may enable uninterrupted presentation of additional content when, for example, an application 710 may try to block the additional content, and the like.

Figure 8:
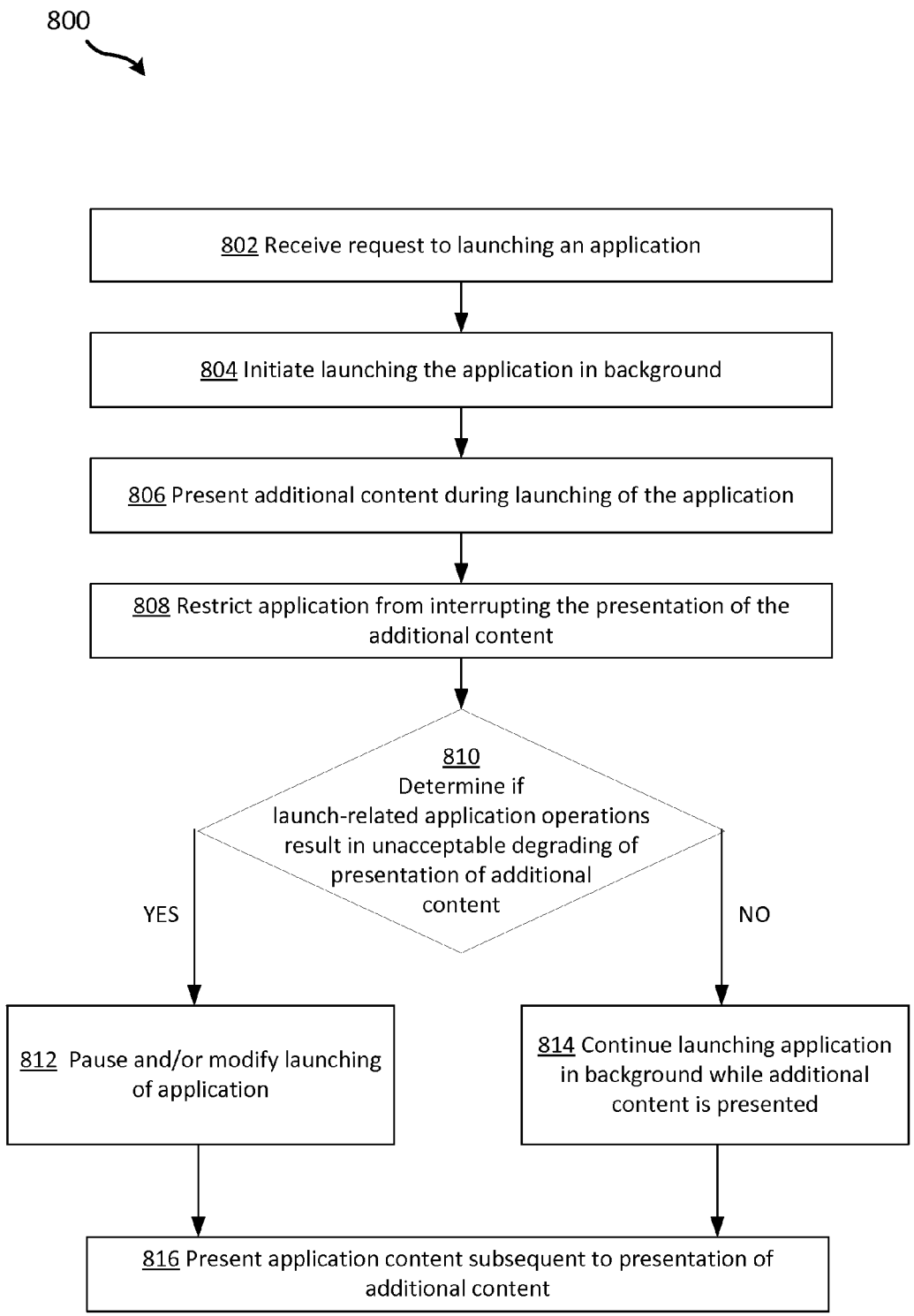
FIG. 8 is a diagram illustrating an example process for displaying additional content as a pre-stitial during launching of an application that may be used in accordance with the present disclosure.

FIG. 8 is a diagram illustrating an example process 800 for displaying additional content as a pre-stitial during launching of an application that may be used in accordance with the present disclosure. Process 800 may begin at operation 802, at which a request is received to launch an application, such as application 710. For example, a user may select an icon for the application from a device home screen or may otherwise request launching of the application. At operation 804, launching of the requested application in the background is initiated. For example, client device 714 may begin to read and process data associated with use of the application, and the application may request data from various resources on the client device 714. Additionally, in some examples, data associated with the application may be sent to, and/or requested from, sources external to the client device, such as one or more external servers associated with the application. For example, state information for a video game may sometimes be retrieved from one or more external game servers. The application launch initiated at operation 804 is performed in the background. For example, presentation of application content may be prevented from interrupting and/or obstructing presentation of additional content, as will be described below with reference to operations 806-814

At operation 806, the client device 714 presents additional content, such as an advertisement or notification, during launching of the application. As set forth above, the additional content may sometimes be retrieved, upon request, from an external server or other external source. By contrast, in some examples, the additional content may be stored locally on the client device 714 in advance of its presentation at operation 806. Various techniques for selecting and configuring additional content for presentation, such as using versions with different levels of fidelity, are set forth above and are not repeated here. In some examples, at least part of the application launch process may be performed during display of the additional content.

At operation 808, the launching application is restricted from interrupting the presentation of the additional content. As set forth above, in some examples, one or more components on the client device 714, such as content priority mitigation component 706, may be employed to restrict the launching application from interrupting the presentation of the additional content. For example, such components may instructing the launching application to hold or delay presentation of its associated application content and/or may deny requests from the launching application to display its application content during presentation of the additional content. In some examples, such components may include an SDK and/or associated instructions that function to restrict the launching application from interrupting the presentation of the additional content. Additionally, in some examples, an SDK and/or associated instructions that function to restrict the launching application from interrupting the presentation of the additional content may be integrated into the launching application itself, such as in the form of an application wrapper or as other instructions integrated with the launching application.

At operation 810, it is determined if any launch-related application operations will result in an unacceptable degrading of the presentation of the additional content. For example, as set forth above, the client device may have only limited amounts of various available computing resources, such as network communications bandwidth, processing capacity, memory capacity, and other resources. Even when a launching application is not directly interrupting presentation of additional content (e.g., by blocking its display, etc.), various operations performed by the launching application may nevertheless result in an unacceptable degrading of the presentation of the additional content, such as by using limited resources that would otherwise be required to present the additional content without degradation. For example, a launching application may attempt to consume network communications bandwidth to download application-related information from a server, and this potential consumption of network communications bandwidth may result in an unacceptable reduction in download speed and/or video quality associated with the additional content. Additionally, the launching application may attempt to use processing and/or memory resources that may be required to present the additional content with acceptable speed and/or quality.

If, at operation 810, it is determined that one or more launch-related application operations will result in an unacceptable degrading of the presentation of the additional content, then the launching of the application may be paused and/or modified at operation 812. In some examples, operation 812 may include pausing launching of the application until the presentation of the additional content is determined to be complete, such as after expiration of a time period for displaying the additional content or upon a user request to display application content or to otherwise discontinue presentation of the additional content. Also, in some examples, operation 812 may include pausing launching of the application until it is determined that there are sufficient available resources to both present the additional content in an acceptable manner (e.g., with acceptable quality) and to perform launch-related application operations. By contrast, in some examples, operation 812 may not involve a complete pausing of the application launch but may, instead, include modifying of the application launch such that the application launch no longer results in an unacceptable degradation of the presentation of the additional content. For example, the application launch may be modified to at least temporarily reduce the amount of one or more resources consumed by the application launch. For example, if various network communications included within application launch procedures are determined to result in unacceptable degradation of the presentation of the additional content, then those network communications may be reduced, postponed, cancelled or otherwise modified, even while still proceeding with other launch-related operations that do not significantly hinder the presentation of the additional content. In other examples, if launch-related application operations are determined to consume memory and/or processing resources needed to present the additional content, than those launch-related application operations may also be reduced, postponed, cancelled or otherwise modified. It is noted that, in addition to operation 808, operations 810 and 812 may also be performed, for example, using an SDK or associated instructions included within the application itself and/or various components external to the application.

If, at operation 810, it is determined that no launch-related application operations will result in an unacceptable degrading of the presentation of the additional content, then the launching of the application may continue in the background at operation 814. It is noted that, in some examples, the launching application may be continuously and/or repeatedly monitored to ensure that its launch will not result in an unacceptable degradation of the presentation of the additional content, and, in such examples, operations 810, 812 and/or 814 may be performed repeatedly during the application launch process.

At operation 816, application content is presented subsequent to the presentation of the additional content, such as such as after expiration of a time period for displaying the additional content or upon a user request to display application content or to otherwise discontinue presentation of the additional content. It is noted that process 800 of FIG. 8 is merely one non-limiting example of various presentation priorities that may be enforced for presentation of application content and additional content and that many other different presentation priorities are contemplated for use in accordance with the techniques described herein. For example, in some cases, if an application launch is determined to prevent or interfere with presentation of a high-fidelity version of additional content but not with a low fidelity-version of the video content, then the application launch may be given priority over presentation of the high-fidelity video content. This may result in selection of the low-fidelity version of the additional content for presentation while the application launches in the background. Various other different presentation priorities may also be selected and enforced.

Figure 9:
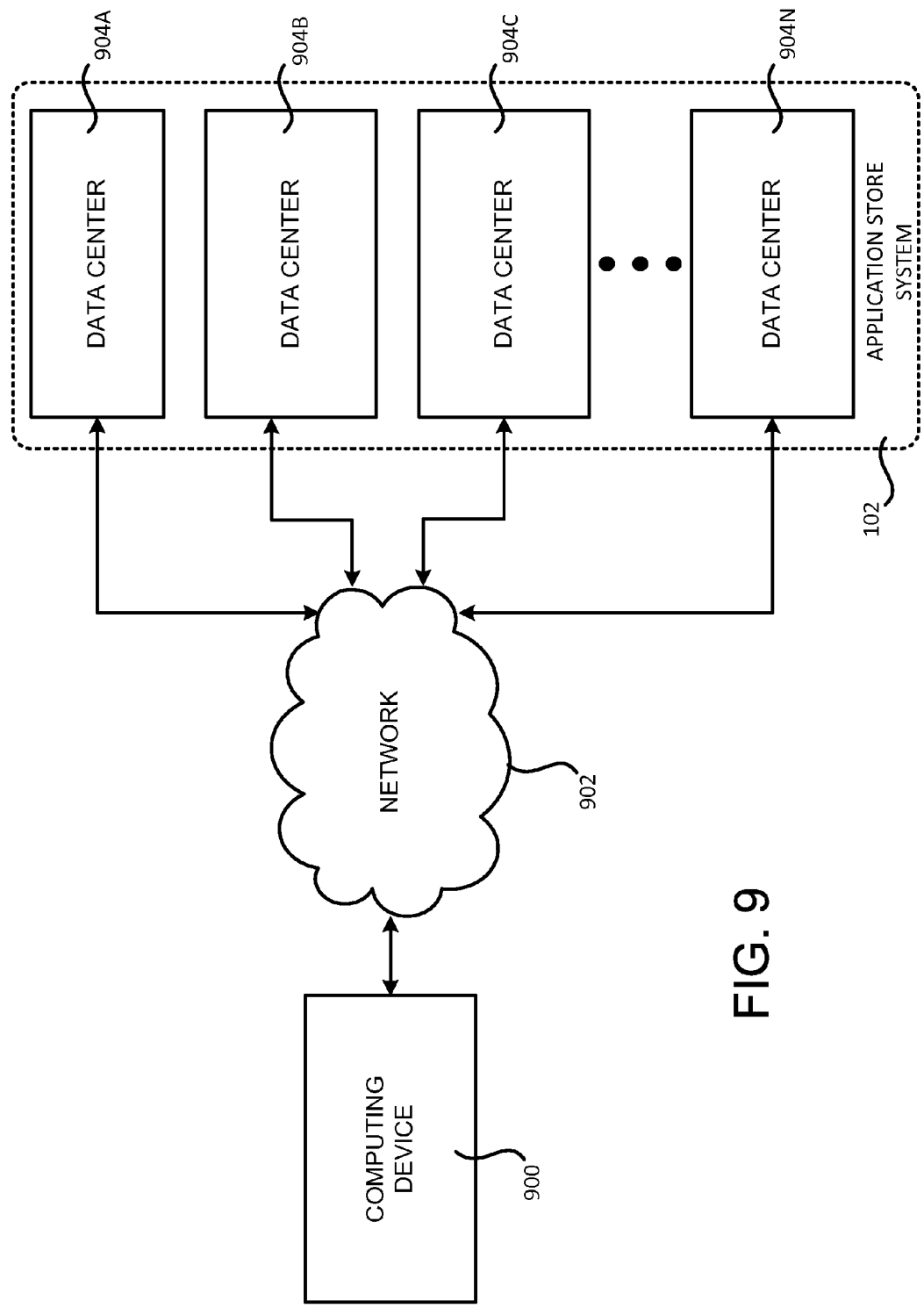
FIG. 9 is a system and network diagram that shows an illustrative operating environment that includes an application store system that may be configured to implement aspects of the functionality described herein.

FIG. 9 is a system and network diagram that shows one illustrative operating environment for the configurations disclosed herein that includes an application store system 102 that may be configured in the manner described above, according to one configuration disclosed herein. As discussed above, the application store system 102 can provide computing resources for implementing an application store 104. The computing resources provided by the application store system 102 may include various types of computing resources, such as data processing resources, data storage resources, networking resources, data communication resources, network services, and the like.

Each type of computing resource provided by the application store system 102 may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, some or all of the services described above, and/or other types of programs. Data storage resources may include file storage devices, block storage devices, and the like. The application store system 102 might also be configured to provide other types of resources and network services.

The computing resources provided by the application store system 102 are enabled in one implementation by one or more data centers 904A-904N (which may be referred herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 might also be located in geographically disparate locations. One illustrative configuration for a data center 904 that implements some of the technologies disclosed herein will be described below with regard to FIG. 10.

The customers and other users of the application store system 102 may access the application store 104 provided by the application store system 102 over a network 902, which may be a wide area communication network ("WAN"), such as the Internet, an intranet or an Internet service provider ("ISP") network or a combination of such networks. For example, and without limitation, a computing device 900 operated by a customer or other user of the application store system 102 might be utilized to access the application store system 102 by way of the network 902. It should be appreciated that a local-area network ("LAN"), the Internet, or any other networking topology known in the art that connects the data centers 904 to remote customers and other users may be utilized. It should also be appreciated that combinations of such networks might also be utilized.

Figure 10:
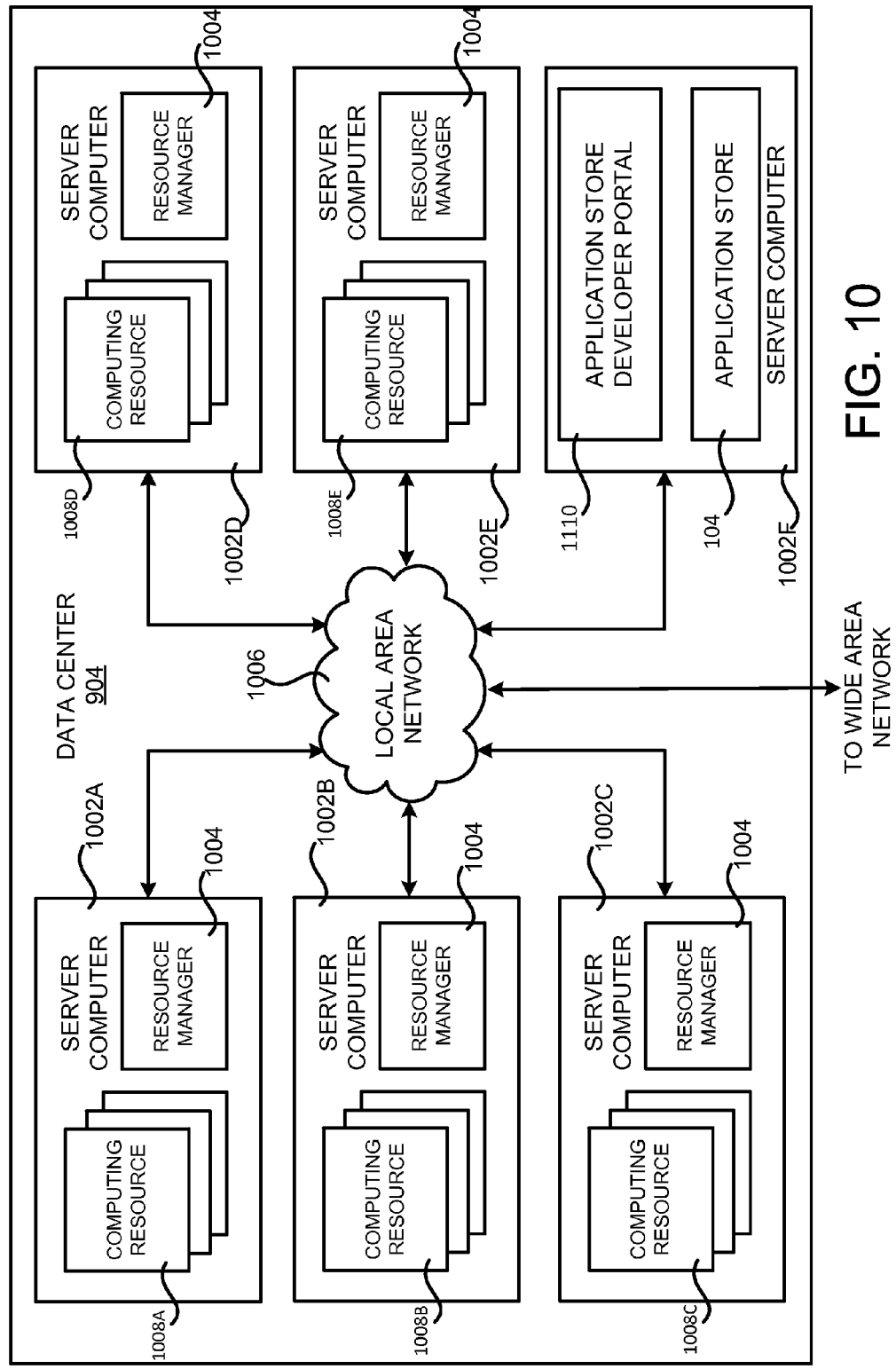
FIG. 10 is a computing system diagram that illustrates a configuration for a data center that may be utilized to implement aspects of the technologies disclosed herein.

FIG. 10 is a computing system diagram that illustrates one configuration for a data center 904 that implements aspects of the technologies disclosed herein. The example data center 904 shown in FIG. 10 includes several server computers 1002A-1002F (which may be referred to herein singularly as "a server computer 1002" or in the plural as "the server computers 1002") for providing computing resources 1008A-1008E.

The server computers 1002 may be standard tower, rack-mount, or blade server computers configured appropriately for providing the computing resources described herein. As mentioned above, the computing resources might be data processing resources such as virtual machine instances or hardware computing systems, data storage resources, database resources, networking resources, and others. Some of the servers 1002 might also be configured to execute a resource manager 1004 capable of instantiating and/or managing the computing resources. In the case of virtual machine instances, for example, the resource manager 1004 might be a hypervisor or another type of program configured to enable the execution of multiple virtual machine instances on a single server 1002. Server computers 1002 in the data center 904 might also be configured to provide network services and other types of services for supporting the provision of an application store 104.

The data center 904 shown in FIG. 10 also includes a server computer 1002F that may execute some or all of the software components described above. For example, and without limitation, the server computer 1002F might be configured to execute software components for providing an application store, including the specific functionality disclosed herein. The server computer 1002F might also be configured to execute other components and/or to store data for providing some or all of the functionality described herein. In this regard, it should be appreciated that the software components illustrated in FIG. 10 as executing on the server computer 1002F might execute on many other physical or virtual servers in the data centers 904 in various configurations.

In the example data center 904 shown in FIG. 10, an appropriate LAN 1006 is also utilized to interconnect the server computers 1002A-1002F. The LAN 1006 is also connected to the network 902 illustrated in FIG. 9. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 904A-904N, between each of the server computers 1002A-1002F in each data center 904, and, potentially, between computing resources in each of the data centers 904. It should be appreciated that the configuration of the data center 904 described with reference to FIG. 10 is merely illustrative and that other implementations might be utilized.

Figure 11:
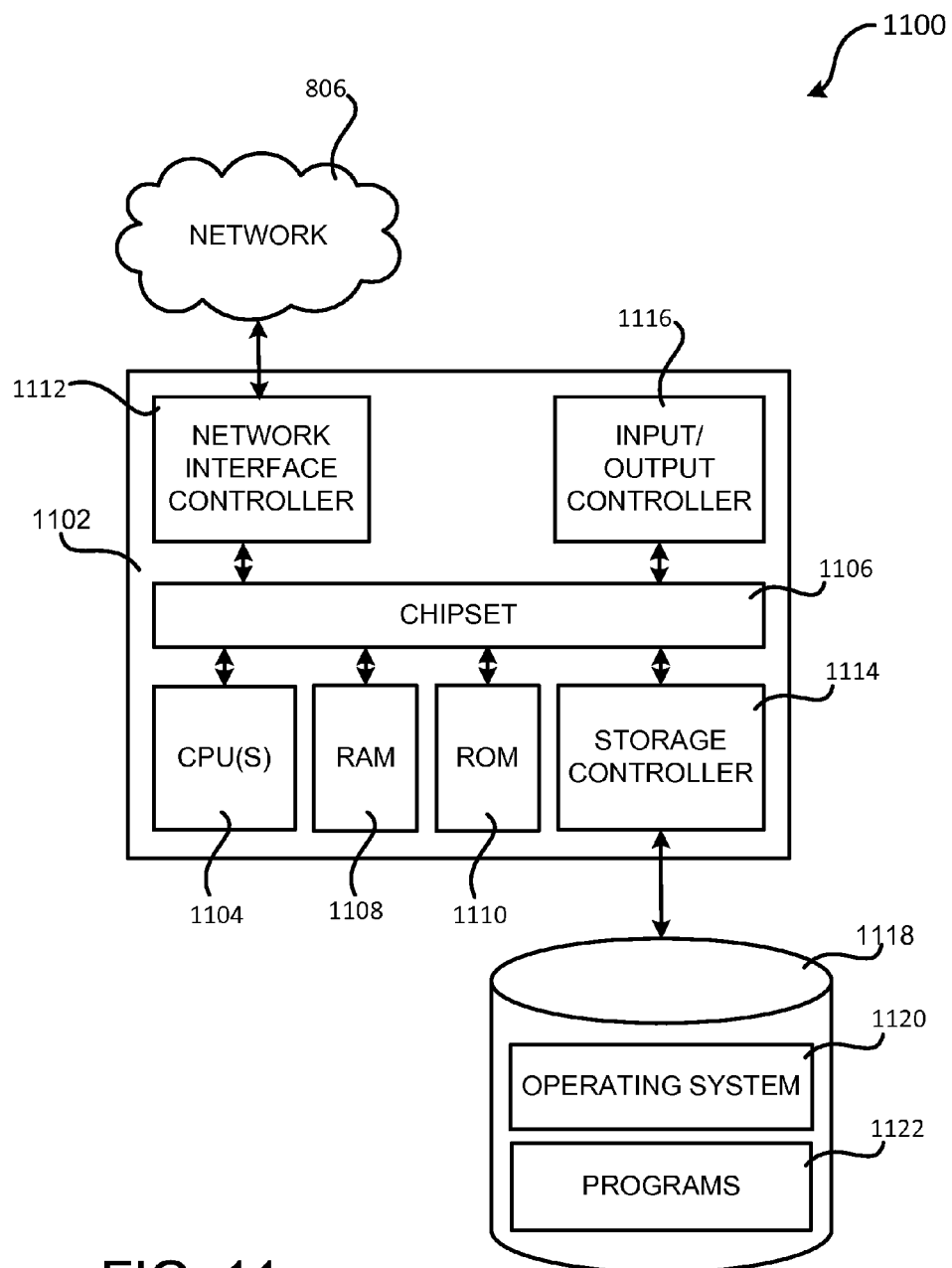
FIG. 11 is a computer architecture diagram showing an illustrative computer hardware architecture for implementing a computing device that might be utilized to implement aspects of the various technologies presented herein.

FIG. 11 shows an example computer architecture for a computer 1100 capable of executing program components for implementing various aspects of the functionality described herein. The computer architecture shown in FIG. 11 illustrates a conventional server computer, workstation, desktop computer, laptop, tablet, network appliance, e-reader, smartphone, or other computing device, and may be utilized to execute any of the software components presented herein. For example, the computer architecture shown in FIG. 11 may be utilized to execute software components for providing an application store and the related functionality disclosed herein.

The computer 1100 includes a baseboard 1102, or "motherboard," which is a printed circuit board to which a multitude of components or devices may be connected by way of a system bus or other electrical communication paths. In one illustrative configuration, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a RAM 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the configurations described herein.

The computer 1100 may operate in a networked environment using logical connections to remote computing devices and computer systems through a network, such as the network 1006. The chipset 1106 may include functionality for providing network connectivity through a NIC 1112, such as a gigabit Ethernet adapter. The NIC 1112 is capable of connecting the computer 1100 to other computing devices over the network 1006. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store an operating system 1120, programs 1122, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1118 may store an operating system 1120 utilized to control the operation of the computer 1100. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 1118 may store other system or application programs and data utilized by the computer 1100.

In one configuration, the mass storage device 1118 or other computer-readable storage media is encoded with computer-executable instructions, which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described herein. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, an input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

It should be appreciated that although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computing system for displaying application content and additional content comprising:
    one or more processors;
    one or more memories having stored therein computer instructions that, upon execution by the one or more processors, cause at least the computing system to perform operations comprising:
        receiving, over a network, a first version of the additional content;
        storing the first version of the additional content
        receiving a request to launch an application associated with the application content;
        determining, based at least in part on the request, whether one or more conditions are satisfied for retrieving, over a network, at least one other version of the additional content from a set of other versions of the additional content;
        when the one or more conditions are determined to be satisfied:
            selecting for retrieval a second version of the additional content from the set of other versions of the additional content;
            retrieving the second version of the additional content over a network; and
            displaying the second version of the additional content;
        when the one or more conditions are determined not to be satisfied, displaying the first version of the additional content; and
        displaying the application content subsequent to the displaying of the first or the second version of the additional content.

2. The computing system of claim 1, wherein the one or more conditions comprise at least one of an available network connection or meeting specified criteria related to one or more of network connection quality, amount of available bandwidth, amount of available processing resources, amount of available memory resources, device settings, or device characteristics.

3. The computing system of claim 1, wherein the second version of the additional content, upon being retrieved, has a higher fidelity than the first version of the additional content.

4. The computing system of claim 1, wherein the second version of the additional content comprises at least some added content that is not included in the first version of the additional content.

5. A computer-implemented method for displaying application content and additional content, the computer-implemented method comprising:
    receiving, over a network, a first version of the additional content;
    storing the first version of the additional content;
    determining that one or more conditions are satisfied for retrieving, over a network, at least one other version of the additional content from a set of other versions of the additional content;
    selecting for retrieval a second version of the additional content from the set of other versions of the additional content;

retrieving the second version of the additional content over a network and displaying the second version of the additional content; and displaying the application content subsequent to the displaying of the first or the second version of the additional content.

6. The computer-implemented method of claim 5, wherein the second version of the additional content is selected for retrieval based, at least in part, on the one or more conditions.

7. The computer-implemented method of claim 5, wherein it is determined that the one or more conditions are satisfied for retrieving, over a network, a plurality of other versions of the additional content from the set of other versions of the additional content, and wherein the second version is selected for retrieval based, at least in part, on the second version being a highest fidelity version of the plurality of other versions.

8. The computer-implemented method of claim 5, wherein the second version of the additional content, upon being retrieved, has a higher fidelity than the first version of the additional content.

9. The computer-implemented method of claim 5, wherein the second version is transmitted using at least one of a higher encoding bitrate than the first version or a higher proportion of forward error correction that the first version.

10. The computer-implemented method of claim 5, wherein the second version of the additional content comprises at least some added content that is not included in the first version of the additional content.

11. The computer-implemented method of claim 5, further comprising:

receiving a request to launch an application associated with the application content, and wherein the determining is performed based at least in part on the request.

12. The computer-implemented method of claim 5, wherein the one or more conditions comprise at least one of an available network connection or meeting specified criteria related to one or more of network connection quality, amount of available bandwidth, amount of available processing resources, amount of available memory resources, device settings, or device characteristics.

13. The computer-implemented method of claim 5, further comprising:

collecting metric information associated with the additional content; and transmitting the metric information to a network device upon detection of satisfaction of a bandwidth threshold.

14. The computer-implemented method of claim 5, wherein at least part of an application launch process is performed during displaying of the first or the second version of the additional content.

15. One or more non-transitory computer-readable storage media having stored thereon instructions that, upon execution on at least one compute node, cause the at least one compute node to perform operations comprising:

receiving, over a network, a first version of additional content;

storing the first version of the additional content;

determining that one or more conditions are satisfied for retrieving, over a network, at least one other version of the additional content from a set of other versions of the additional content;

selecting for retrieval a second version of the additional content from the set of other versions of the additional content;

retrieving the second version of the additional content over a network and displaying the second version of the additional content; and displaying application content subsequent to the displaying of the first or the second version of the additional content.

16. The one or more non-transitory computer-readable storage media of claim 15, wherein the second version of the additional content, upon being retrieved, has a higher fidelity than the first version of the additional content.

17. The one or more non-transitory computer-readable storage media of claim 15, wherein the second version is transmitted using at least one of a higher encoding bitrate than the first version or a higher proportion of forward error correction that the first version.

18. The one or more non-transitory computer-readable storage media of claim 15, wherein the second version of the additional content comprises at least some added content that is not included in the first version of the additional content.

19. The one or more non-transitory computer-readable storage media of claim 15, wherein the operations further comprise:

receiving a request to launch an application associated with the application content, and wherein the determining is performed based at least in part on the request.

20. The one or more non-transitory computer-readable storage media of claim 15, wherein the one or more conditions comprise at least one of an available network connection or meeting specified criteria related to one or more of network connection quality, amount of available bandwidth, amount of available processing resources, amount of available memory resources, device settings, or device characteristics.

* * * * *